(12) United States Patent
Koopmans et al.

(10) Patent No.: US 10,313,252 B2
(45) Date of Patent: Jun. 4, 2019

(54) METHOD AND SYSTEM FOR DYNAMIC INTERLEAVING

(71) Applicant: Citrix Systems, Inc., Fort Lauderdale, FL (US)

(72) Inventors: Christopher Raymond Koopmans, Menlo Park, CA (US); Frederick Alan Koopmans, Menlo Park, CA (US); Nicholas James Stavrakos, Sunnyvale, CA (US); Amalraj Antonysamy, Palo Alto, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 262 days.

(21) Appl. No.: 15/161,069

(22) Filed: May 20, 2016

(65) Prior Publication Data

US 2016/0269300 A1 Sep. 15, 2016

Related U.S. Application Data

(63) Continuation of application No. 10/871,905, filed on Jun. 17, 2004, now Pat. No. 9,357,033.

(Continued)

(51) Int. Cl.
*H04L 29/06* (2006.01)
*H04L 12/851* (2013.01)
*H04L 29/08* (2006.01)

(52) U.S. Cl.
CPC .............. *H04L 47/24* (2013.01); *H04L 67/28* (2013.01); *H04L 67/32* (2013.01); *H04L 67/42* (2013.01);

(Continued)

(58) Field of Classification Search
CPC ......... H04L 47/24; H04L 67/02; H04L 67/28; H04L 67/32; H04L 67/42; H04L 69/14; H04L 69/166

See application file for complete search history.

(56) References Cited

U.S. PATENT DOCUMENTS 5,732,219 A 3/1998 Blumer et al.
5,960,404 A * 9/1999 Chaar .................. G06F 9/5038
705/7.15

(Continued)

OTHER PUBLICATIONS

Cardellini, Valeria et al., "Dynamic Load Balancing on Web-Server Systems," IEEE Internet Computing, May/Jun. 1999, pp. 28-39.

(Continued)

*Primary Examiner* — Kevin D Mew
(74) *Attorney, Agent, or Firm* — Fox Rothschild LLP; Robert J. Sacco; Carol E. Thorstad-Forsyth

(57) ABSTRACT

A network environment includes a client station coupled to a proxy server via a first network and one or more content servers coupled to the proxy server via a second network. A plurality of connections are established between the client station and the proxy server over the first network. Requests are dynamically interleaved over any of the connections to the proxy server by the client station. Content is retrieved for the requests from any of the content servers over the second network by the proxy server. Responses including retrieved content for respective requests are dynamically interleaved over any of the connections by the proxy server to the client station.

19 Claims, 20 Drawing Sheets

Related U.S. Application Data

(60) Provisional application No. 60/479,349, filed on Jun. 17, 2003.

(52) U.S. Cl.
CPC ............ *H04L 69/14* (2013.01); *H04L 69/166* (2013.01); *H04L 67/02* (2013.01)

(56) References Cited

U.S. PATENT DOCUMENTS

| | | | |
|---|---|---|---|
| 6,073,175 A | 6/2000 | Tavs et al. | |
| 6,105,029 A | 8/2000 | Maddalozzo, Jr. et al. | |
| 6,338,089 B1* | 1/2002 | Quinlan | G06F 17/30899 707/E17.119 |
| 6,397,253 B1 | 5/2002 | Quinlan et al. | |
| 6,438,597 B1 | 8/2002 | Mosberger et al. | |
| 6,496,862 B1* | 12/2002 | Akatsu | H04L 12/26 709/223 |
| 6,532,241 B1 | 3/2003 | Ferguson et al. | |
| 6,600,736 B1* | 7/2003 | Ball | H04L 29/06 370/352 |
| 6,754,621 B1* | 6/2004 | Cunningham | G06Q 40/04 704/219 |
| 6,766,351 B1* | 7/2004 | Datla | G06F 9/547 709/203 |
| 6,898,631 B1* | 5/2005 | Kraft | H04L 12/1831 379/1.03 |
| 7,003,570 B2 | 2/2006 | Messinger | G06F 9/546 709/203 |
| 7,003,572 B1 | 2/2006 | Lownsbrough et al. | |
| 7,062,557 B1 | 6/2006 | Bhatti et al. | |
| 7,171,473 B1* | 1/2007 | Eftis | H04L 12/581 709/224 |
| 7,194,521 B1* | 3/2007 | Wang | H04L 67/02 379/352 |
| 7,225,237 B1 | 5/2007 | Tenereillo | |
| 7,231,446 B2* | 6/2007 | Peiffer | H04L 29/06 370/235 |
| 7,240,100 B1* | 7/2007 | Wein | H04L 67/1008 709/214 |
| 7,337,236 B2 | 2/2008 | Bess et al. | |
| 7,343,398 B1 | 3/2008 | Lownsbrough | |
| 7,349,980 B1* | 3/2008 | Darugar | G06F 17/3089 709/211 |
| 7,447,794 B1* | 11/2008 | Miller | G06F 13/4217 709/216 |
| 7,574,580 B2* | 8/2009 | Mahashin | G11B 27/329 386/326 |
| 7,602,756 B2* | 10/2009 | Gu | H04L 12/2805 370/338 |
| 7,627,658 B2 | 12/2009 | Levett et al. | |
| 7,668,902 B2* | 2/2010 | Harjanto | H04L 29/12169 709/203 |
| 7,676,034 B1* | 3/2010 | Wu | H04M 3/5233 379/265.01 |
| 7,721,294 B2 | 5/2010 | Quinet et al. | |
| 7,853,643 B1* | 12/2010 | Martinez | H04L 29/06 709/201 |
| 2001/0003828 A1 | 6/2001 | Peterson et al. | |
| 2001/0029544 A1 | 10/2001 | Cousins | |
| 2001/0054110 A1 | 12/2001 | Kikinis | |
| 2002/0016844 A1* | 2/2002 | Akasaka | H04L 67/06 709/228 |
| 2002/0042828 A1 | 4/2002 | Peiffer | |
| 2002/0104022 A1* | 8/2002 | Jorgenson | H04L 29/06 726/12 |
| 2002/0116397 A1* | 8/2002 | Berg | H04L 29/06 |
| 2002/0138565 A1 | 9/2002 | Kustov et al. | |
| 2002/0143953 A1* | 10/2002 | Aiken, Jr. | H04L 67/1008 709/227 |
| 2002/0165979 A1* | 11/2002 | Vincent | G06Q 40/04 709/239 |
| 2002/0169818 A1 | 11/2002 | Stewart et al. | |
| 2002/0181395 A1 | 12/2002 | Foster et al. | |
| 2002/0184313 A1* | 12/2002 | Bedos | G06Q 10/107 709/205 |
| 2002/0184340 A1* | 12/2002 | Srivastava | G06F 17/30908 709/219 |
| 2002/0184371 A1* | 12/2002 | Elonen | H04L 67/34 709/227 |
| 2002/0188743 A1 | 12/2002 | Schaffrath | |
| 2003/0009385 A1* | 1/2003 | Tucciarone | G06Q 10/107 705/26.1 |
| 2003/0053446 A1 | 3/2003 | Kwon | |
| 2003/0079041 A1 | 4/2003 | Parrella et al. | |
| 2003/0097464 A1* | 5/2003 | Martinez | H04L 29/06 709/238 |
| 2003/0137970 A1* | 7/2003 | Odman | H04L 29/06 370/350 |
| 2003/0163544 A1* | 8/2003 | Wookey | H04L 41/022 709/217 |
| 2003/0174648 A1* | 9/2003 | Wang | H04L 65/1013 370/235 |
| 2003/0186680 A1 | 10/2003 | Bhasin et al. | |
| 2003/0221000 A1 | 11/2003 | Cherkasova et al. | |
| 2004/0003093 A1* | 1/2004 | Kamath | G06F 9/54 709/227 |
| 2004/0015591 A1 | 1/2004 | Wang | |
| 2004/0019497 A1* | 1/2004 | Volk | G06F 17/30017 705/1.1 |
| 2004/0049537 A1 | 3/2004 | Titmuss | |
| 2004/0064577 A1* | 4/2004 | Dahlin | H04L 29/06 709/235 |
| 2004/0068538 A1* | 4/2004 | Lunenfeld | G06F 17/30864 709/203 |
| 2004/0103373 A1* | 5/2004 | Wei | G06F 17/2247 715/234 |
| 2004/0114559 A1 | 6/2004 | Wang | |
| 2004/0128390 A1* | 7/2004 | Blakley, III | H04L 63/0807 709/228 |
| 2004/0128538 A1* | 7/2004 | Gmuender | H04L 29/06 726/4 |
| 2004/0205614 A1* | 10/2004 | Keswa | H04L 63/08 715/239 |
| 2004/0250059 A1 | 12/2004 | Ramelson et al. | |
| 2005/0114711 A1* | 5/2005 | Hesselink | H04L 63/0209 726/4 |
| 2006/0085559 A1 | 4/2006 | Lownsbrough et al. | |
| 2009/0171950 A1* | 7/2009 | Lunenfeld | G06F 17/30864 |
| 2013/0232249 A1 | 9/2013 | Weihl et al. | |

OTHER PUBLICATIONS

International Search Report and Written Opinion for International application No. PCT/US2004/019369, dated Jan. 20, 2005, 11 pgs.
Fielding, R., et al. "Hypertext Transfer Protocol—HTTP/1.1", Network Working Group, RFC 2068, Jan. 1997, 162 pages.
Fielding, R., et al. "Hypertext Transfer Protocol—HTTP/1.1", Network Working Group, RFC 2616, The Internet Society, Jun. 1999, 114 pages.
Susai, Michel, "TCP/IP Multiplexing Boosts Sites," Network World, vol. 18, No. 12, Mar. 19, 2001, 2 pages.

\* cited by examiner

METHOD AND SYSTEM FOR DYNAMIC INTERLEAVING

RELATED APPLICATION

This application is a continuation of U.S. patent application Ser. No. 10/871,905 filed on Jun. 17, 2004, which claims the benefit of U.S. Provisional Application No. 60/479,349, entitled "METHOD AND SYSTEM FOR DYNAMIC INTERLEAVING," filed on Jun. 17, 2003, both of which are hereby incorporated herein by reference in their entireties.

FIELD

This invention relates generally to data networks and, more particularly, to a method and system for dynamic interleaving of requests and responses on a network.

BACKGROUND

The Internet allows for vast amounts of information to be communicated over any number of interconnected networks, computers, and network devices. Typically, information or content is located at websites on one or more servers, and a user can retrieve the content using a web browser operating on a client station. For example, the user can enter a website address into the web browser or access a web link, which sends requests to the server to access and provide the content on the respective website. This type of communication is commonly referred to as "web browsing."

Web browsing is enjoyed by millions of users on the Internet. However, accessing content on a network that is constrained by bandwidth and latency can make web browsing less enjoyable. Bandwidth affects the time for transmitting content over a network link. Latency affects the aggregate time for sending a request from a client station to a server and receiving a response from the server.

Many networks can suffer from bandwidth and latency problems that degrade the enjoyment of web browsing for users. Wireless wide area networks (WANs), such as GPRS or CDMA 1xRTT wireless networks, are just a few networks, along with traditional plain old telephone (POTS) dialup networks, that can exhibit similar bandwidth and latency problems. These networks may take 50 to 100 seconds to download content from a web page due to bandwidth and latency constraints, whereas a high-speed local area network (LAN) may be less prone to such constraints and can download the same content in 5 to 10 seconds. Waiting a long time to view content for a web page is annoying to users and inefficiently utilizes the network.

Utilizing a network efficiently is also a particular concern for network providers who must share limited resources among many users. For example, wireless WAN providers share very expensive and limited spectrum among all of its data and voice subscribers. Thus, efficient use of this spectrum frequencies is imperative. Furthermore, in a wireless WAN environment, data transmission is more susceptible to interference and noise in contrast to a wired environment. Interference and noise delays the data transmission process and, more importantly, causes variability and unpredictability in the delay. A web site that may download objects in 50 seconds the first time may download the same objects in 100 seconds the next time. Thus, in order to address these concerns, network providers must efficiently use existing network infrastructure to provide the most enjoyment to a user when downloading content.

Furthermore, the manner in which information is transferred on a network plays an important role in the network's efficiency. Referring to the World Wide Web (WWW), the Hypertext Transfer Protocol (HTTP) sets forth the rules for transferring content such as files or objects on the web. This protocol uses requests and responses for transferring content. For example, a user agent (e.g., a web browser or client) sends a request to the content server for a particular file or object of a web page, and the server of the web page looks up the object in a database and sends back the object as part of a response to the user agent. This process continues until every object in the web page has been downloaded to the user agent.

As web pages have become more complex, a common website may contain hundreds of objects on its web pages. Such objects may include text, graphics, images, sound, and etc. The web pages may also have objects located across multiple servers. That is, one server may provide dynamic content (e.g., content that remembers the last books ordered by a user) for a web page, whereas other servers may provide static but rotating content such as an advertisement, and still others provide the static content of the site. As such, before a user can view a web page, hundreds of objects may require downloading from multiple servers. Each server, however, may take a different amount of time to service a request for an object contributing further to latency. Thus, the latency for each server may vary with different levels of magnitude, e.g., one server may respond in milliseconds whereas another server may respond in seconds.

Latency constraints, however, should not be confused with bandwidth constraints. FIG. 1 illustrates the retrieval sequence for objects on a bandwidth constrained network using HTTP over TCP/IP. In this illustration, each request for an object requires a connection to be established between a client and a server with an exchange of "Sync" and "Ack" messages necessary for TCP/IP. Due to the relatively small latency of the network and the responsiveness of the server (primarily the small latency of the network), the Ack message is sent back to the client quickly. However, because the network is bandwidth constrained, a response back to the client takes a relatively long time. This is exacerbated if the object for the request is large in nature and must be broken into many packets as shown in FIG. 1. As a result, the overall download time for each request/response is dominated by the time it takes to download all the packets of the individual objects on a network link. Such download time can be calculated by adding the size of each of the individual objects and dividing the aggregate size by the link bandwidth.

FIG. 2 illustrates the retrieval sequence for objects on a latency constrained network using HTTP over TCP/IP. In this illustration, the network is not limited by bandwidth, but instead by the latency—or the time it takes to send a packet from the client to the server through the network. In particular, when a user agent requests small objects on a network affected by high latency, the overall download time is dominated by the time it takes a request to travel to the server, the responsiveness of the server to process the request, and the time it takes for a response to travel back to user agent. This download time can be calculated by adding the round trip time (RTT) for the request to travel to the server and the response to travel back to the client in addition to the response of the server and multiplying that by the number of objects on the web page.

FIG. 3 illustrates a graph that shows the instantaneous bandwidth versus the download time for an exemplary website (e.g., http://www.cnn.com). This illustration shows how inefficiently a network is utilized when affected by bandwidth constraints. In this example, the network has an ideal bandwidth maximum at 42.9 Kbs. However, only a small portion of the download time is actually spent at the ideal bandwidth. Thus, the network is latency constrained rather than bandwidth constrained.

These problems are well known in the networking community. To increase efficiency, the early web browsers, which implemented the inefficient HTTP 1.0 protocol, opened multiple TCP connections to web servers and simultaneously sent requests on each connection. Each connection then shared the available bandwidth which helped to increase overall bandwidth utilization. However, if the network was latency constrained, improved bandwidth utilization would not provide shorter download times.

Using the HTTP 1.0 protocol in this way has a number of disadvantages. One disadvantage is that it can adversely affect the capacity of servers. For example, if a server serves 100 simultaneous connections, and each user opens 10 connections, the server can only support 10 simultaneous users. However, if one connection is allocated per user, the server could support 100 simultaneous users. Thus, to ensure service to more users, many servers limit the number of connections per user.

Another disadvantage of the HTTP 1.0 protocol is that it can exacerbate the latency constraint effects. For instance, setting up and tearing down a connection requires several exchanges of messages, e.g., Syn, Syn+Ack, Ack, Fin, Ack, Fin, and Ack—which refer to data packet messages under TCP/IP. If a web browser opens 50 connections and the round trip time is 1 second for such messages, 100 seconds are spent for connection maintenance. For this reason, many web browsers limit the number of connections that can be established, e.g., some web browsers only allow 2 to 6 connections.

The HTTP 1.1 protocol addressed some disadvantages of the HTTP 1.0 protocol. For instance, the HTTP 1.1 protocol standardized the maximum number of connections a web browser could open to four. For most LAN environments with relatively low latency, a web browser having four open connections provides sufficient performance. The HTTP 1.1 protocol also standardized a technique referred to as "persistent connections," which is an extension to the HTTP 1.0 protocol. A persistent connection allows multiple requests to be sent on the same connection. For example, a web browser can open a connection, make a request, receive the response, and then make another request on the same connection without tearing it down and forming a new connection.

Although HTTP 1.1 introduced concepts to alleviate the problems with connection maintenance, it did not address the adverse affect of HTTP 1.1 and 1.0 on the content server's capacity. Additionally, persistent connections do not improve download time performance if web page objects are spread across multiple servers or if the user browses from one page to the next. Either of these cases would require closing the old connection.

The HTTP 1.1 protocol did alleviate problems with persistent connections regarding dynamic content, which was not addressed in the persistent connection extension to HTTP 1.0. That is, the HTTP 1.0 protocol extension allowed for a "keep alive" feature for a persistent connection that required the content server to specify the length of a response in order for the client to distinguish one response from the next. However, this would not work if the web server was providing dynamic content and could not determine the size of the dynamic content ahead of time. Therefore, the server needed to avoid using persistent connections and closed the connections after downloading dynamic content responses. To address this problem, the HTTP 1.1 protocol allowed for "chunked" transfer encoding that allowed the content server to simply specify the size of the next chunk of data and use a special delimiter when the dynamic content transfer was completed. This allowed user agents to keep its persistent connections open for dynamic content.

With the advent of persistent connections, the use of an intermediary or proxy server located between client stations and content servers became popular in many networks. Typically, a proxy server was used in an enterprise environment for security reasons, but it could also be used to improve network performance. For example, web browsers operating on client stations could open a number of persistent connections to the proxy server. The proxy server could then open new persistent connections to the content servers. In this manner, web browsers reused their persistent connections to the proxy server for downloading the objects of a web page, even if the objects resided on different content servers. Furthermore, the proxy server reused its persistent connections to the content servers for multiple web browsers. For popular web pages, the proxy server could maintain persistent connections without tearing them down.

Thus, the proxy server improved performance for a latency constrained network by allowing a web browser to open persistent connections with the proxy server only once. This reduced the exchange of messages when downloading objects of a web page. Using a proxy server with existing HTTP protocols, however, suffers from the request-response nature of such prior protocols. For instance, even though the proxy server could maintain persistent connections, the proxy server could only have one outstanding request on each persistent connection. As a result, before another request could be issued, its response had to be received first, which is illustrated in FIG. 4. Consequently, the HTTP 1.1 protocol introduced "pipelining" to alleviate this problem. Pipelining allows a user agent to send multiple requests on a given connection without the requirement of receiving responses for previous requests. This reduced the effects of latency on the download time of web pages with multiple objects, and thus reduced download times on latency constrained networks, which is illustrated in FIG. 5.

The above prior techniques of using persistent connections, chunked encoding, proxy servers, and pipelining can improve performance, however, a number of disadvantages are apparent for these prior techniques. For example, the prior techniques do not account for the varying delays across different content servers or web servers. In addition, a prior proxy server receiving responses from content servers must deliver all responses to web browsers in the same order that the requests were received by the proxy server. Consequently, if a content server that receives a first request from a web browser is slow, a proxy server must hold up all other responses designated for the web browser until the slow content server responds. The slow server may not even respond. In this case, the proxy server must close the connection with the web browser and disregard any previously received responses from other content servers.

Another disadvantage of the prior techniques is that the prior techniques cannot efficiently handle responses with large objects that may monopolize a pipeline on a connection. For instance, if a web browser requests many objects on one pipelined connection, and the first request actually corresponds to a very large object, all the smaller objects will be blocked at the proxy until the large object completes. If the web browser had known of this ahead of time, it would have requested the large object on another connection outside of the pipeline so that the smaller objects could proceed in parallel on another connection outside of the pipeline so that the smaller objects could proceed in parallel.

Thus, there is a need to overcome the above limitations of the prior techniques and provide a more efficient manner of handling requests and responses on a network.

SUMMARY

According to one aspect of the invention, a network environment includes a client station coupled to a proxy server via a first network and one or more content servers coupled to the proxy server via a second network. A plurality of connections are established between the client station and the proxy server over the first network. Requests are dynamically interleaved over any of the connections to the proxy server by the client station. Content is retrieved for the requests from any of the content servers over the second network by the proxy server. Responses including retrieved content for respective requests are dynamically interleaved over any of the connections by the proxy server to the client station.

According to another aspect of the invention, a client station is disclosed having at least one queue to store one or more requests, a user agent, and a processing engine. The user agent generates requests for objects. The processing engine receives the requests, classifies the requests, stores the requests in the queue, and selects an ordering for sending the requests based on the classification of the request.

According to another aspect of the invention, a proxy server includes at least one queue to store one or more responses and a processing engine. The processing engine receives responses from a content server, classifies the responses, stores the responses in the queue, and selects an ordering for sending the responses based on the classification of the responses.

According to another aspect of the invention, a system comprises at least one client station coupled to a proxy server via a network. At least one connection is established between the client station and proxy server. Requests are dynamically interleaved to the proxy server from the client station over any established connection. Responses are dynamically interleaved from the proxy server to the client station over any established connection.

According to another aspect of the invention, a computer readable medium including instructions, which if executed by a computing system, causes the computing system to perform an operation comprising: receiving requests for objects; classifying the requests; storing the requests in at least one queue; and selecting an ordering for sending the requests based on the classification of the requests.

According to another aspect of the invention, a computer readable medium including instructions, which if executed by a computing system, causes the computing system to perform an operation comprising: receiving responses including objects; classifying the responses; storing the responses in at least one queue; and selecting an ordering for sending the responses based on the classification of the requests.

DRAWINGS

The accompanying drawings, which are incorporated in, and constitute a part of the specification, illustrate exemplary implementations and examples of the invention and, together with the detailed description, serve to explain the principles of the invention. In the drawings, FIG. 1 illustrates the retrieval sequence for objects on a bandwidth constrained network using HTTP over TCP/IP;

DETAILED DESCRIPTION

Reference will now be made in detail to exemplary implementations and examples of the invention, examples of which are illustrated in the accompanying drawings. Wherever possible, the same reference numbers will be used throughout the drawings to refer to the same or like parts.

Dynamic Interleaving Overview

The disclosed dynamic interleaving techniques, implementations, and examples overcome the limitations associated with prior techniques and provide a more efficient manner and unique way of handling requests and responses for content on a network. A dynamically interleaving system (DIS) or network environment is disclosed that uses a dynamic interleaving protocol (DIP)—("DIP protocol")—to dynamically interleave requests and responses on a network. The system can include at least one client station coupled to a proxy server via a first network and one or more content servers coupled to the proxy server via a second network. A plurality of connections can be established between each client station and proxy server according to the DIP protocol.

According to one example, the client station can dynamically interleave requests on any of the connections to the proxy server. By dynamically interleaving requests, the client station has more flexibility and control on which connections to send a request. In certain examples, the client station can classify a request based on any number of criteria, e.g., size of the requested object, and selectively order requests to be sent to the proxy server based on a classification of the requests, or choose a connection (preferably a less bandwidth constrained connection) to send the request based on a classification of the requests.

According to another example, the proxy server can dynamically interleave responses on any of the connections to the client station. By dynamically interleaving responses, the proxy server also has more flexibility and control on which connections to send a response. In certain examples, the proxy server can also classify responses based on any number of criteria and selectively order responses to be sent to the client station based on a classification of the responses, or choose a connection for sending responses based on a classification of the responses.

Thus, in certain examples, the proxy server may send responses in any desired order instead of the order the requests were received by the proxy server. As a result, a response from a slow server can be sent to the client station after a response from a faster server. This prevents the response from the slow server from stalling the pipeline. Other features and advantages of the DIP protocol over prior techniques and protocols will become apparent from the description provided below to improve a network's efficiency.

Dynamic Interleaving System (DIS)

Figure 1:
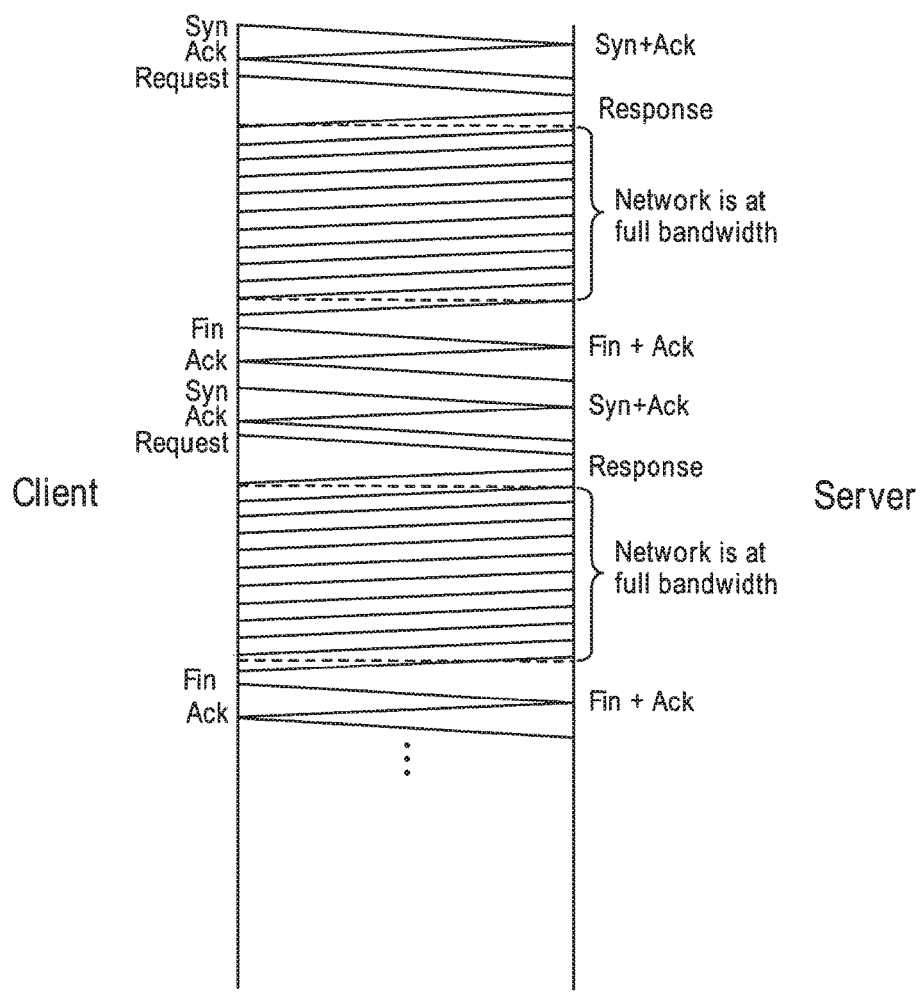
Figure 2:
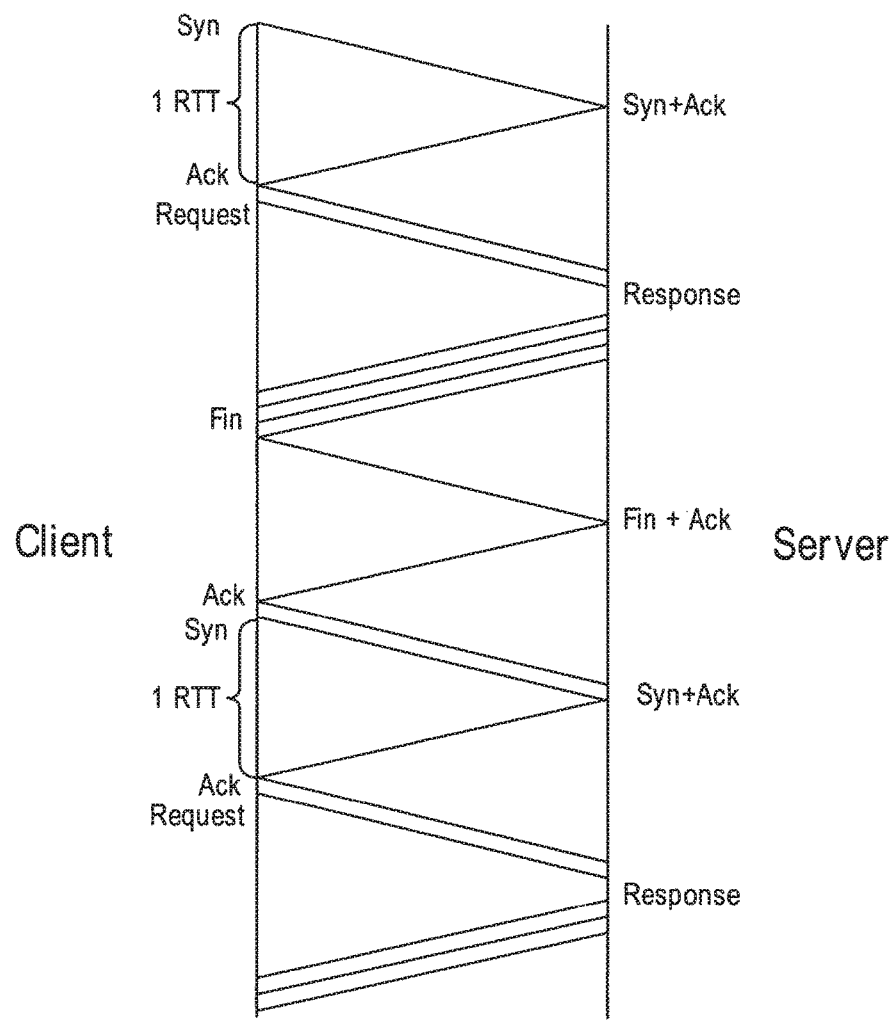
FIG. 2 illustrates the retrieval sequence for objects on a latency constrained network using HTTP over TCP/IP.
Figure 3:
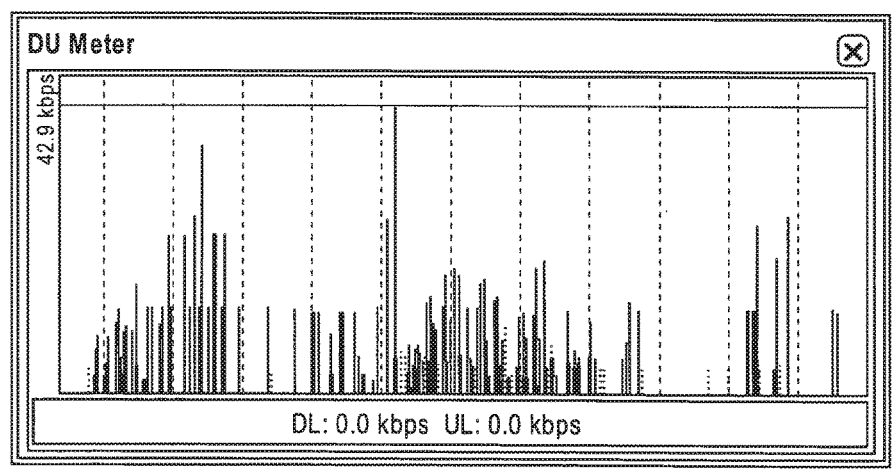
FIG. 3 illustrates a graph that shows the instantaneous bandwidth versus the download time for an exemplary website.
Figure 4:
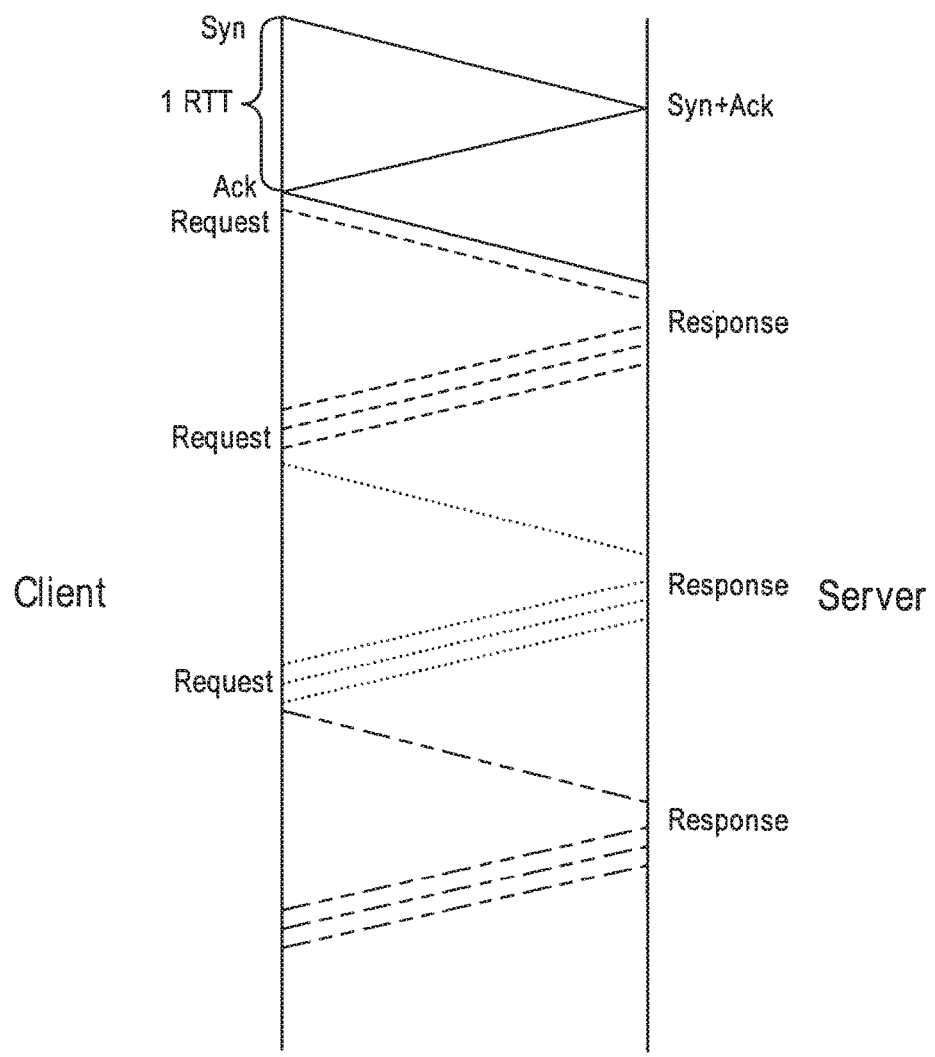
FIG. 4 illustrates download times using persistent connections on a latency constrained network.
Figure 5:
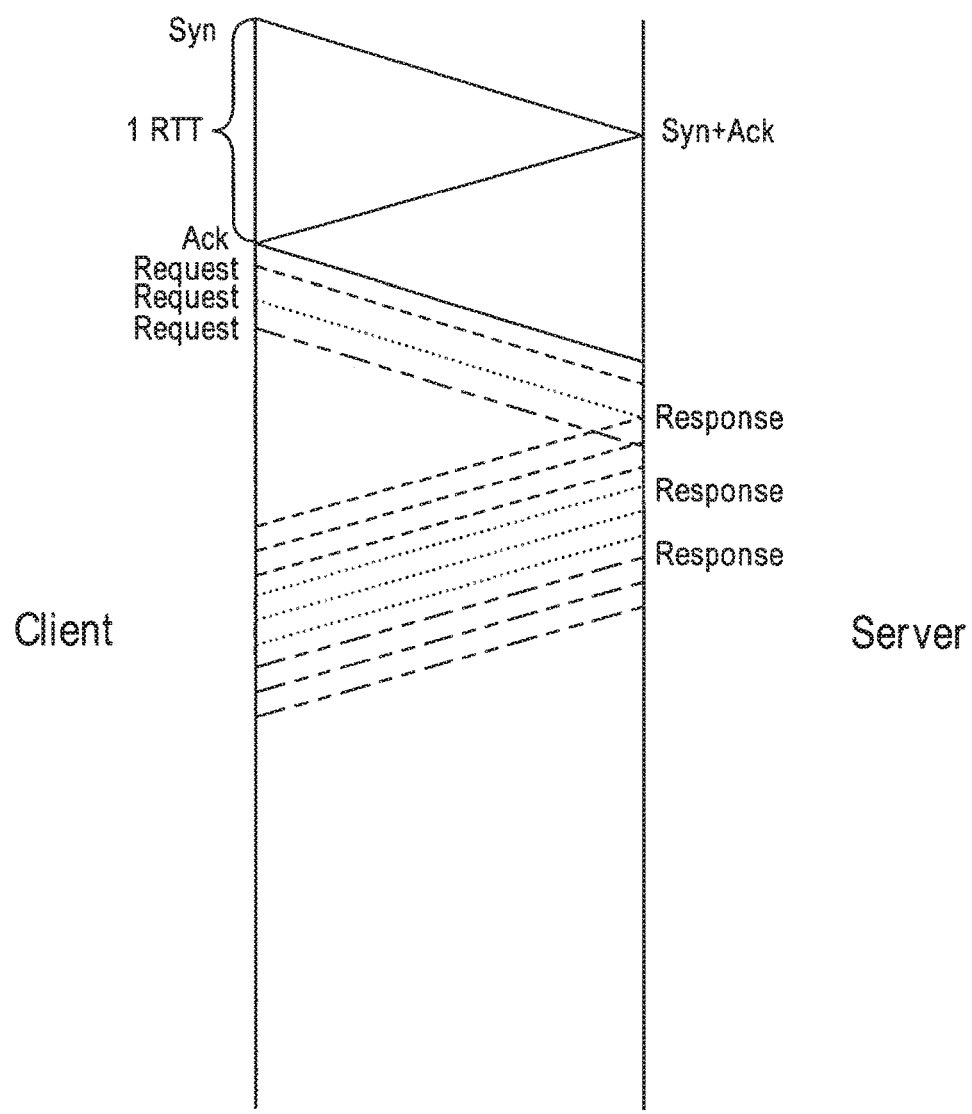
FIG. 5 illustrates download times using pipelined persistent connections on a latency constrained network.
Figure 6:
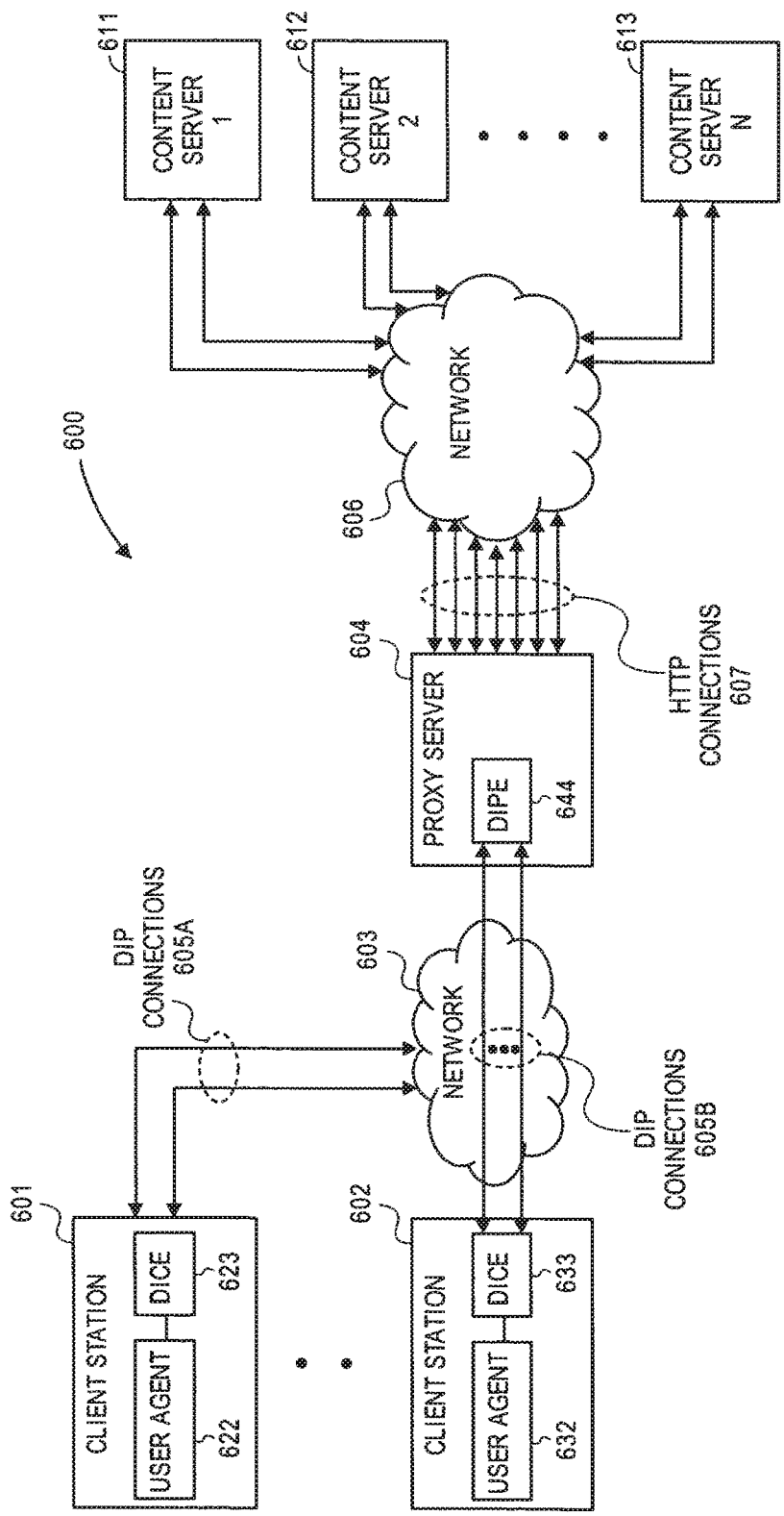
FIG. 6 illustrates one example of a dynamic interleaving system (DIS) for handling requests and responses.

FIG. 6 illustrates one example of a dynamic interleaving system (DIS) 600 utilizing the DIP protocol described herein. In this example, DIS 600 includes a plurality of client stations (601 and 602) coupled to a proxy server 604 over a network 603. Proxy server 604 couples these client stations 601 and 602 to a plurality of content servers 1-N (611-613) over a network 606. Networks 603 and 606 can include any combination of wide area networks (WANs), local area networks (LANs), or wireless networks suitable for networking communication such as Internet communication.

Client stations 601 and 602 establish a plurality of connections 605A and 605B, respectively, to the proxy server 604 over network 603. Each client station has its own set of connections to proxy server 604. Connections 605A and 605B can represent any end-to-end relationship by which data can be transmitted. In certain examples, these connections are "persistent connections." Messages including requests and responses are handled on these connections according to the DIP protocol described in more detail below. Thus, connections 605A and 605B are referred to as DIP connections 605A and 605B, respectively. Although not shown, client stations 601 and 602 can have non-DIP connections with proxy server 604 in which standard HTTP protocols are used.

User agents 622 and 632 operating in client stations 601 and 602 (e.g., web browsers) can issue requests for content, e.g., web page objects, on any of content servers 611-613. These requests are processed by a dynamically interleaving content engine (DICE) 623 and DICE 633 in respective client stations according to the DIP protocol. DICE 623 and 633 interact with respective user agents to request content from content servers 611-613. DICE 623 and 633 controls the flow of data to and from user agents 622 and 632. In certain examples, DICE 623 and 633 receive requests from user agents 622 and 632, process those requests according to the DIP protocol, and send the processed requests to proxy server 604, and retrieve responses from proxy server 604, which are eventually forwarded to respective user agents.

Figure 7A:
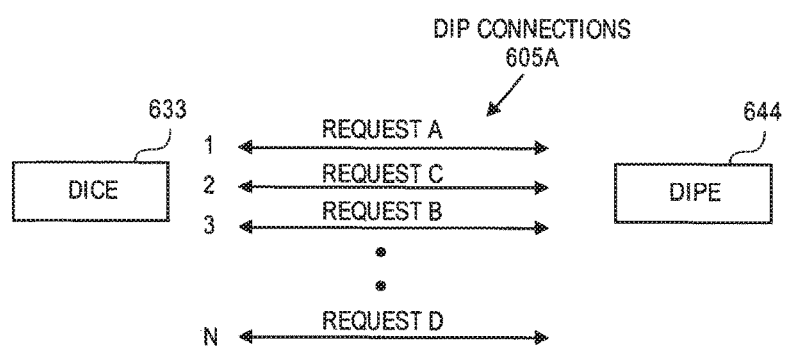
FIGS. 7A and 7B illustrate one example of dynamically interleaving requests or parts of requests on connections from a client station to a proxy server.
Figure 7B:
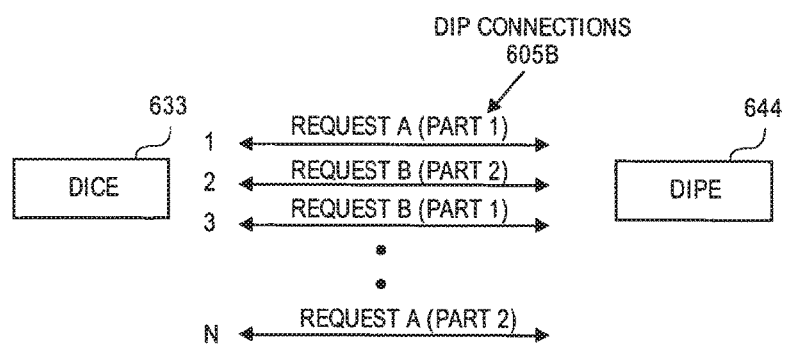

One feature of the DIP protocol allows DICE 623 and DICE 633 to dynamically interleave their requests to proxy server 604 over network 603 on any of their respective DIP connections and in any order (unless specified). For example, referring to FIG. 7A, if user agent 632 in client station 602 issues Requests A, B, C, and D in that order, DICE 633 can process those requests and dynamically interleave them on DIP connections 605B such that Requests A, C, B, and D are transmitted on connections, 1, 2, 3, 4, and N, respectively, of DIP connections 605B. These requests can also be interleaved on the same connection in the same or different order. In addition, DICE 633 can dynamically interleave parts of requests as well, as explained in further detail with respect to "chunk" encoding and multiplexing. Referring to FIG. 7B, DICE 633 dynamically interleaves Parts 1 and 2 for Request A on connections 1 and N, respectively, and Parts 1 and 2 for Request B on connections 3 and 2, respectively. The parts of requests can also be interleaved on the same connection in the same or different order. In the above examples, as detailed below, the manner of interleaving requests can be determined by a classification of the requests.

Proxy server 604 acts as an intermediary between client stations 601 and 602 and content servers 611-613 and bridges networks 603 and 606. Proxy server 604 includes a dynamic interleaving proxy engine (DIPE) 644 that receives the requests (including parts of requests) from DICE 623 or 623 over DIP connections 605. DIPE 644 can establish connections 607 over network 606 to content servers 611-613. Similar to the DIP connections 605A and 605B, connections 607 can be any sort of end-to-end relationship by which data can be transmitted. In this example, since content servers 611-613 do not necessarily require modification, connections 607 can implement standard protocols to communicate with content servers 611-613. For example, connections 607 could be used to implement HTTP standard protocols over TCP/IP and to have persistent connections or pipelining or any connection convent servers 611-613 can support. For this example, messages including requests and responses are handled under existing HTTP protocols. Thus, connections 607 are referred to as HTTP connections 607. DIPE 644 retrieves the content, e.g., objects, for the requests from any of the content servers 611-613 over network 606 using HTTP connections 607.

Figure 8A:
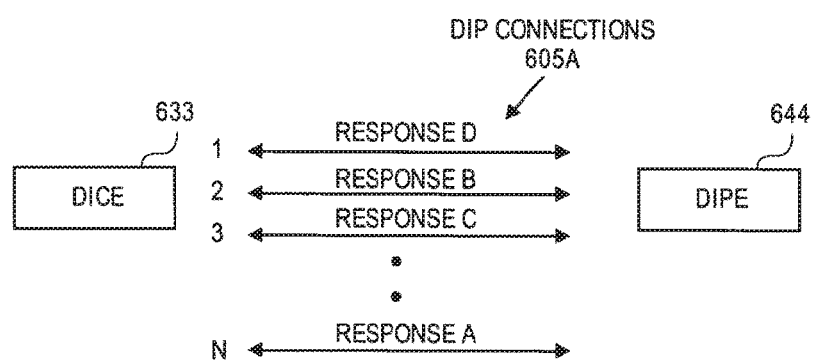
FIGS. 8A and 8B illustrates one example of dynamically interleaving responses or parts of responses on connections from a proxy server to a client station.

One feature of the DIP protocol allows DIPE 644 to dynamically interleave responses including the retrieved content for respective requests to clients 601 and 602 over network 603 using any of the client's respective DIP connections and in any order (unless specified). For example, referring to FIG. 8A, regardless of the order and of the connections proxy server 604 receives Requests A, B, C, and D from DICE 633, DIPE 644 can dynamically interleave responses for those requests such that Responses D, B, C, and A are transmitted on connections, 1, 2, 3, 4, and N, respectively, of DIP connections 605B to client station 602.

Figure 8B:
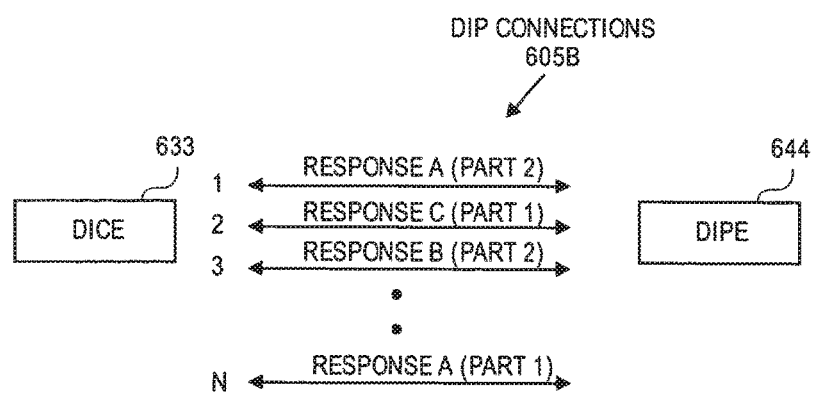

These responses can also be interleaved on the same connection in the same or different order. Likewise, parts of responses can be dynamically interleaved as well. Referring to FIG. 8B, DIPE 644 can dynamically interleave Parts 1 and 2 for Response A on connections N and 1, respectively, and Parts 1 and 2 for Response B on connections 2 and 3, respectively. Parts of responses can also be interleaved on the same connection in the same or different order. In these examples, however, the responses have been transmitted on different connections than their respective requests. Furthermore, in the above examples, as detailed below, the manner of interleaving responses can be determined by a classification of the responses.

Moreover, in DIS 600, assuming network 603 experiences bandwidth and latency constraints and network 606 experiences minimal constraints, proxy server 604 can shield the constraints of the constrained network 603 from network 606. For example, by using the IP protocol, proxy server 604 can use network 603 more efficiently to mask bandwidth and latency constraints on network 603 from network 606. The DIP protocol allows the proxy server 604 to increase bandwidth utilization on the DIP connections 605 over network 603.

Furthermore, DIS 600 shown in FIG. 6 can have any number of variations, while implementing the DIP protocol. In certain examples, DICE 623 or 633 can be part of user agents 622 and 632, or can be separate modules that intercept requests from user agents 622 and 632, respectively, and process them before they are transmitted to proxy server 604. For some example, user agents 622 and 632 issue standard HTTP requests that are intercepted by DICE 623 and 633, respectively, and processed under the DIP protocol. In particular, DICE 623 and 633 can add unique IDs and classification information to the headers of the requests prior to being sent to proxy server 604.

In other examples, DICE 623 and 633 are plug-in modules to user agents 622 and 632 and DIPE 644 is part of middleware on a proxy server or content server. Another example is having a DICE implemented on an intermediary proxy server between a client station and a DIPE of another proxy server connected to content servers. These examples are illustrative in nature and not intended to be exhaustive. Other features of the DIP protocol and operation of the DICE and DIPE within DIS 600 are described in further detail below.

Dynamic Interleaving Protocol (DIP)

Figure 9:
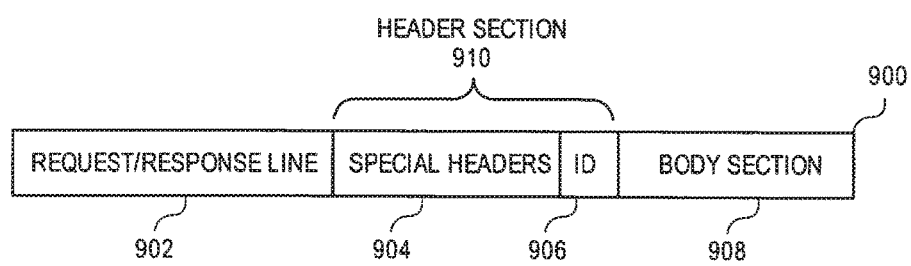
FIG. 9 illustrates one example of a request or response message according to a dynamic interleaving protocol (DIP) format.

FIG. 9 illustrates an exemplary block diagram of a request/response message data format according to the DIP protocol used in DIS 600. The message 900 for a request or response includes a request or response line 902 (depending if the message is a request or response), header section 910 having special headers 904 and an ID field 906, and a body section 908. The special headers 904 and ID field 965 allow a DICE and DIPE to perform functions not available in existing HTTP protocols. For example, as detailed below, a DICE and DIPE can use special control information in special headers 904 and ID in ID field 906 to precisely control utilization of DIP connections 605.

In certain examples, message 900 can be based on the HTTP 1.1 message format, as described in the RFC 2616 Hypertext Transfer Protocol HTTP 1.1, with the exception of special headers 904 and ID field 906. For example, special headers 904 can include special control information for implementing the DIP protocol. The following describes some exemplary features of the DIP protocol that can use message 900 shown in FIG. 9.

Exemplary Features

A feature of the DIP protocol is that each DICE can maintain multiple DIP connections, e.g., persistent connections implementing the DIP protocol, with a DIPE of a proxy server. Each DICE can control the number of connections with the DIPE and refuse to open new connections if a maximum number connections have been opened.

A feature of the DIP protocol is that each DICE can reuse connections for multiple requests. In certain examples, each DICE can send a message with persistency headers in special headers 904 of a message 900 shown in FIG. 9 that are recognizable by a DIPE.

A feature of the DIP protocol is that each DICE can have multiple outstanding requests on the same connection. For example, each DICE can issue multiple requests on the same connection before a response is received for earlier requests. Referring to FIG. 9, each request and response message is associated with a unique ID stored in the ID field 906. The IDs allow a DICE to match requests with received responses and determine which responses have not been received based on the IDs. Referring to FIG. 9, header section 910 and body section 908 can be easily delineated, e.g., with double "newlines." Special headers 904 may include control information such as the length of header section 910 or "chunked" encoding information so that body section 908 can be transmitted in parts and multiplexed on the connections, as shown, e.g., in FIGS. 7B and 8B.

A feature of the DIP protocol is that each DICE can issue requests for objects or content from multiple content servers on the same connection. Requests on a connection can include in special headers 904 control information specifying a particular content server for the request. The DIPE recognizes such control information in special headers 904 and pulls the content from the specified content server.

A feature of the DIP protocol is that the DIPE can perform DNS requests on a network on behalf of each DICE. If a request includes control information in special headers 904 requesting a specific content server specified as a FQDN, a DICE does not need to perform DNS requests over the network. Instead, the DIPE can resolve the name before connecting to the content server over the network. For instance, a content server can be specified by name (e.g., www.cnn.com) without resolution (e.g., 10.3.21.23). Typically, a client performs the resolution by contacting the DNS server over a constrained network. However, with the DIP protocol, the name of the content server can be specified unresolved, and the DIPE can perform resolution over an unconstrained network.

A feature of the DIP protocol is that each DICE can specify an absolute order to the DIPE in which responses should be sent. For example, a DICE can send a request message with control information in special headers 904 specifying a particular order for receiving responses, e.g., send response 1 before response 2 and so on. Once the DIPE recognizes the specified order information, the DIPE will send responses according to that order.

A feature of the DIP protocol is that the DIPE can control the overlapping depth of outstanding requests for each DICE. That is, the DIPE can control the maximum number of outstanding requests each DICE may send before receiving a response. For example, the DIPE can include control information in special headers 904 of a response message to a DICE specifying the overlapping depth for the connection. If a DICE receives this message, the DICE will configure itself so as not have more than the maximum number of allowed outstanding requests on the connection.

A of feature of the DIP protocol is that each DICE can indicate to the DIPE not to send responses in a specified order. For example, a DICE can include control information in special headers 904 of a request message specifying no order for receiving responses. As a result, the DIPE can control the optimal order for sending responses.

A feature of the DIP protocol is that each DICE can specify a loose ordering among the requests, and allow the DIPE to determine the best order within the loose ordering. Loose ordering can be specified by control information within special header 904 of a request message. As such, a DICE can specify to the DIPE that responses for Requests 1 and 2 must be sent before responses for Requests 3 and 4, but that the responses for Requests 1 and 2 and the responses for Requests 3 and 4 can be sent in any order, i.e., response for Request 2 may be sent before the response for Request 1.

A feature of the DIP protocol is that each DICE can maintain multiple connections to the DIPE, independent of the number of outstanding requests.

A feature of the DIP protocol is that a DICE can send a request and receive its response on different connections. Since each request and response has a unique ID in its ID field 906, the DIPE can freely select any connection to send a response that can be easily associated with a respective request at a DICE. In certain examples, before the DIPE can send a response to a DICE, the DICE must first send a request to identify the DICE to one or more connections. The ID in ID field 906 may also include client source information as well as an ID for the request. In such a case, each DICE can send a "dummy" request message with ID information so that the DIPE can associate the DICE to the connection the request was sent on.

A feature of the DIP protocol is that each DICE can multiplex multiple request bodies (or whole requests) onto the same connection (or different connection). The DIP protocol provides a unique transfer encoding scheme based on the "multiplexing" scheme described in HTTP 1.1 that allows "chunks" or parts of the body section 908 of a request to be segmented and sent as individual request messages with unique IDs. Such a request message includes in its special headers 904 control information indicating that it is a "chunk" request message. The multiple parts of chunks can be interleaved or multiplexed on the same or different connections to the DIPE, and responses to the parts or chunks can also be interleaved or multiplexed on the same or different connections to the DICE, as illustrated in FIG. 7B and FIG. 8B.

A feature of the DIP protocol is that each DICE can abort individual requests without affecting other requests, or having to reissue requests. Each DICE can send a request message with "abort" control information in special headers 904 informing the DIPE to abort all processing of a request with a particular ID. Once the DIPE receives such a message, the DIPE aborts all processing of requests with the ID. The abort message can be sent on a different connection than the request identified in the abort message. Each DICE can also abort responses for any requests in which an abort message has been received by closing the connection. The DIPE can inform each DICE of any aborted requests and that no further processing will be performed.

A feature of the DIP protocol is that each DICE can "resume" aborted requests on a new connection. Each DICE can send a request message with "resume" control information in its special headers 904 that allows the aborted request to resume on another connection. Furthermore, each DICE can maintain a list of request IDs that have been resumed and those that have been aborted. When the DIPE receives a resume request message, the DIPE, however, views the request as a new request instead of as an aborted request.

A feature of the DIP protocol is that the DIPE can instruct a DICE to open a new connection for a response. The DIPE can send a response message to each DICE having "bypass" control information in its special headers 904 that informs the DICE to form a new connection. In other words, the DIPE instructs the DICE to "resume" a request on a new connection until the response has been received.

A feature of the DIP protocol is that data streams or messages sent on the connections between each DICE and DIPE can be compressed. Each DICE and DIPE can specify if compression is required for any data streams or messages. Appropriate compression and decompression techniques can be used in each DICE and DIPE.

Dynamic Interleaving Client Engine (DICE)

Figure 10:
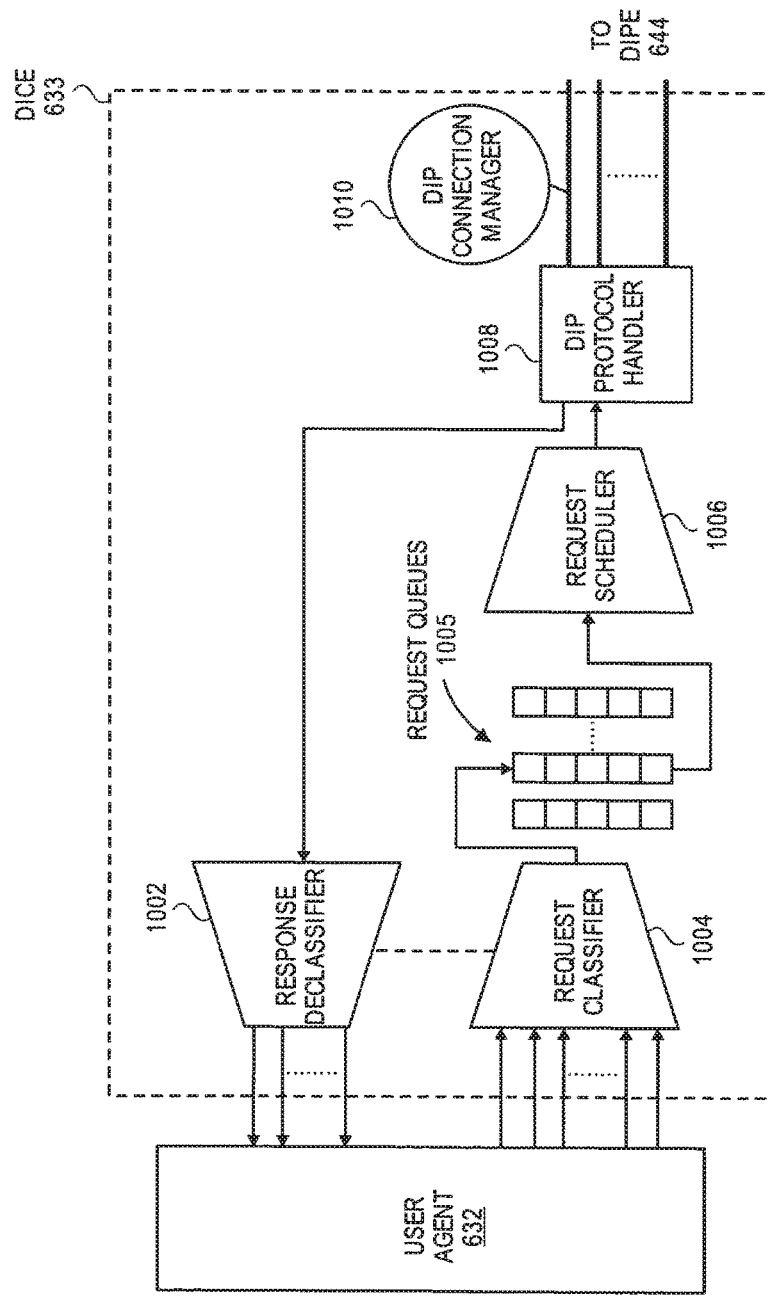
FIG. 10 illustrates one example of a block diagram of the internal components of a dynamic interleaving client engine (DICE) for a client station.

DICE 223 and 233 reside on client stations 601 and 602, respectively, and can controls the data flow to respective user agents according to the DIP protocol. FIG. 10 illustrates one example of a block diagram of the internal components of DICE 633 for client station 602. In this example, reference is made to the internal components of DICE 633 for client station 602, however, the same components can be implemented in any client station. DICE 633 includes a response declassifier 1002 and request classifier 1004 coupled to user agent 632, request queues 1005, request scheduler 1006, DIP Protocol Handler 1008, and DIP connection manager 1010. These components can be any combination of hardware and/or software to implement the techniques described herein. These components are described in further detail below.

User Agent

User agent 632 can be a web browser operating on client station 602. When a user browses a web page, user agent 632 generates requests for objects on the page, and the requests are processed by DICE 633 and DIPE 644. The DIPE 644 retrieves responses for the requests, which are eventually forwarded to user agent 632 via DICE 633 according to the DIP protocol. As noted above, the above features of the DIP protocol can improve the enjoyment of a user by reducing the effects of bandwidth and latency constraints on a network when downloading objects of a web page.

User agent 632 can issue multiple types of requests, some occurring more often than others. For instance, a request for an object is the most frequent request. Requests for an object may also including ordering information specifying ordering related to the requests. For example, if user agent 632 makes a request for an object "foo.gif," user agent 632 can specify that the response for this object must be received before any other responses for subsequent requests Typically, requests for an object occur when a user is browsing a web page. In this case, user agent 632 generates a request to download an object. As objects are downloaded, user agent 632 can generate more requests if it realizes more objects are needed to complete the web page. User agent 632 can also decide if ordering is necessary for these requests, and, if necessary, notifies DICE 633 of the ordering to follow for sending responses.

The abort request occurs frequently for any number of reasons. For example, a user may click the "stop" button on a browser to stop the download of a web page. In this case, a DICE generates an abort request for the DIPE to abort the request and response without tearing down any connections. Unlike prior techniques, the abort request according to the DIP protocol does not tear down connections to abort requests, which improves efficiency of a network connection.

Another example of an abort request is when a user closes a web browser that causes all requests for objects in the window to be aborted. If the window was a pop-up window, only the objects in the pop-up window need to be aborted. Another example is if the user clicks on a link to navigate to another web page before the web page finished downloading, DICE 633 issues an abort for any outstanding requests to DIPE 644. If the request in not aborted, DICE 633 and user agent 632 expect a response for the request. Responses can be dynamically interleaved to user agent 632 for optimal user experience.

Request Classifier

Figure 11:
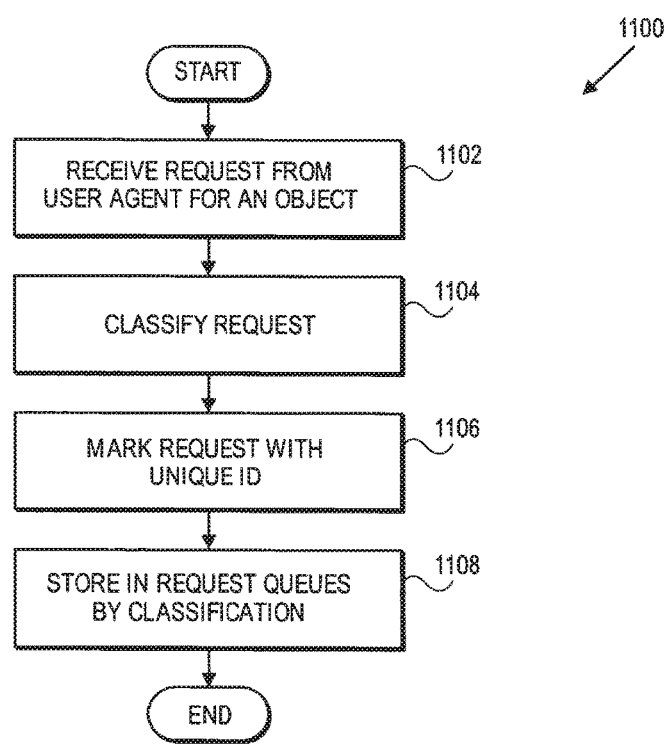
FIG. 11 illustrates one example of a method for a request classifier in a DICE.

Request classifier 1004 receives requests from user agent 632 and processes them prior to being stored in request queues 1005. FIG. 11 illustrates one example of a method 1100 for request classifier 1004 in DICE 633.

Initially, request classifier 1004 receives a request for an object from user agent 632 (step 1102). After receiving a request for an object, request classifier 1004 classifies the request (step 1004). In this step, request classifier 1004 can classify the request using the exemplary classifications noted below. Next, request classifier 1004 marks the request with a unique identifier ID (step 1106). Each request for an object has a unique ID. The ID may also include client station source information, which can be part of the unique request ID. For example, the unique request ID can be concatenated to the client station source information. Control information may also be included in the request message if required. For example, referring to FIG. 9, a request message 900 may include special headers 904 where control information can be stored. The unique ID is also stored in the ID field 906. Request classifier 1004 then stores the request into a priority queue within response queues 1005 based on the classification of the request (step 1008). Each priority queue may be designated for a particular classification. Request classifier 1004 can classify a request based on the following exemplary classifications:

Size of the Request:

Request classifier 1004 can classify requests based on the size of a request. For example, a request can be classified as small if it does not contain a body section 908, i.e., the request has a header section 910 only. Requests that have a body section can be classified as large. If a request is classified as large or small, request scheduler 1004 stores the request in a priority queue within request queues 1005 for requests classified as large or small.

Likelihood Request Will Stall the Pipeline:

Request classifier 1004 can classify requests based on a likelihood the request will stall the pipeline on a connection. Request classifier 1005 can examine the request for an object and determine if the request for an object will take a long time to receive a response from a content server. For example, if the requested object is for an advertisement, which is likely to be on a slow server, the response for the advertisement may take a long time. Such a request can be classified as likely to stall the pipeline. If a request is classified as likely to stall the pipeline, request classifier 1004 stores the request in a priority queue within request queues 1005 for this type of classification.

Likelihood Request Will Monopolize Pipeline for a Long Period of Time:

Request classifier 1004 can classify requests based on a likelihood the request will monopolize the pipeline for a long period of time. For example, request classifier 1004 can determine if requests are for small objects within a web page such as HTML, GIF, JPEG, JS, and CSS objects, which have a low likelihood of monopolizing the pipeline. In contrast, requests for objects such as DOC, XLS, PPT, PDF, MP3, MPG objects have a high likelihood of monopolizing the pipeline. These objects are typically not part of a web page, but are typically downloaded by themselves and large in size. Accordingly, request classifier 1004 stores such a request in a priority queue within request queues 1005 for these types of classifications.

Ordering Requirements from the User Agent:

Request classifier 1004 can classify requests based on ordering requirement from user agent 632. User agent 632 can determine if ordering is important for the requests and specify a particular order, e.g., a strict or loose ordering. Request classifier 1004 stores requests with ordering in a priority queue within request queues 1005 for requests classified with ordering requirements.

Likelihood Request in on a Critical Path:

Request classifier 1004 can classify requests based on the likelihood that the request is on a critical path. Request classifier 1004 can examine the request to determine if the request will generate additional requests. For example, a request for objects such as gif and jpeg objects are not likely to generate further requests, however, they typically come after requests for objects such as html and js objects. Request for html and js objects typically generate further request due to additional objects embedded in them. For these types of requests, request classifier 1004 stores the request in a priority queue within request queues 1005 for this type of classification.

Request Scheduler

Request scheduler 1006 schedules requests from request queues 1005 to DIP protocol handler 1008 for transmission to DIPE 644. Request scheduler 1006 is configured to respect any maximum scheduling depths (total number of outstanding requests for a connection) imposed by proxy server 604 according to the DIP protocol.

Figure 12:
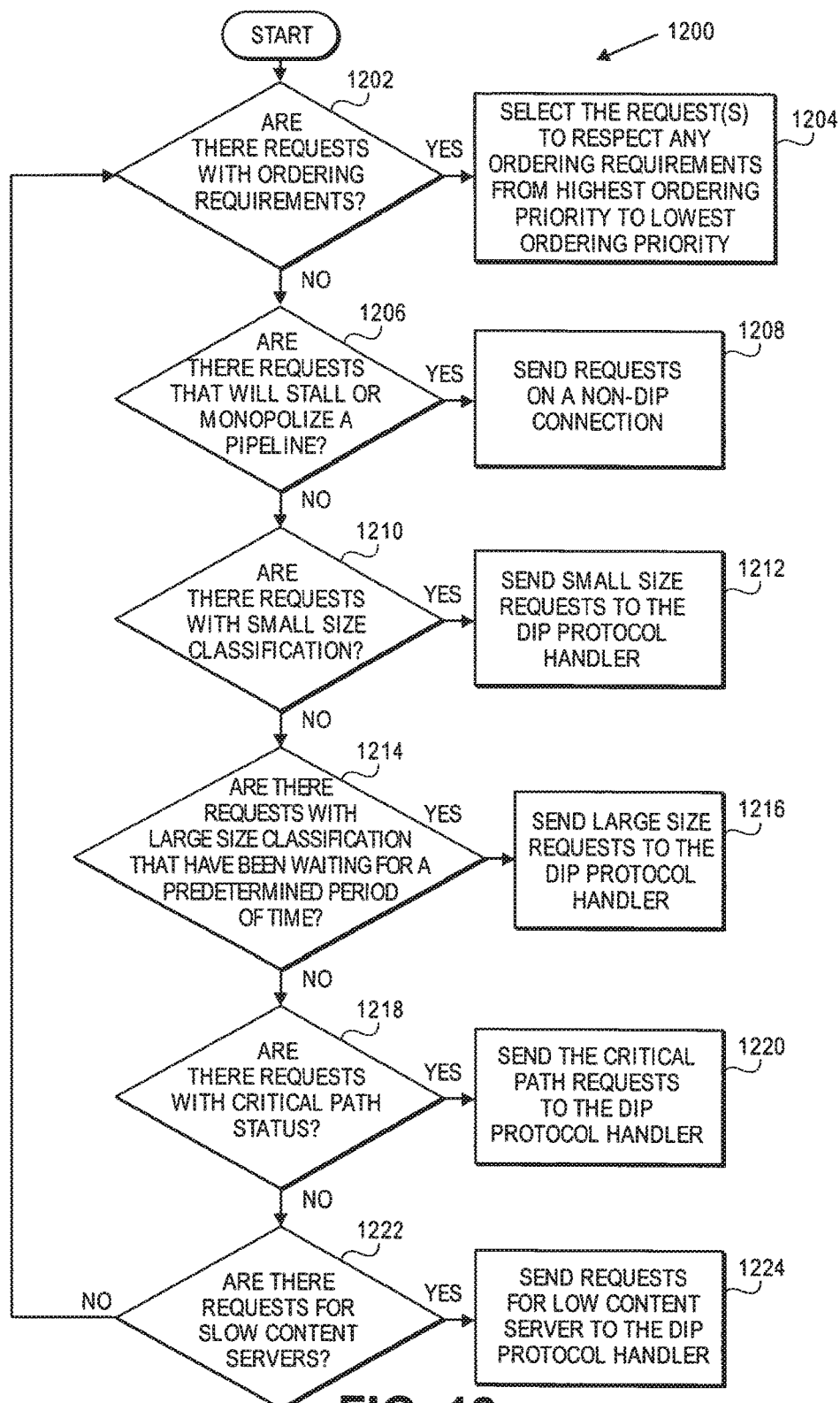
FIG. 12 illustrates one example of a scheduling method for a request scheduler in a DICE.

FIG. 12 illustrates one example of a scheduling method 1200 for request scheduler 1006 in DICE 633. Initially, a check is made if any requests in request queues 1005 have ordering requirements (step 1202). If there are requests with ordering requirements, request scheduler 1006 selects the request(s) to respect any ordering requirements from highest ordering priority to lowest ordering priority.

For example, for five requests (A, B, C, D, and E), there may be a strict ordering requirement for requests A, B, and C where A must come before B and B before C, and a loose ordering requirement for D and E that must come before A, B, and C. In this case, requests D and E have a higher ordering requirement and requests A, B, and C have a lower ordering requirement. Request scheduler 1006 will then select requests D and E before requests A, B, and C. However, scheduler 1006 must choose between request D and E within the loose ordering requirement. Consequently, the tie breaking decision process for requests D and E can be determined by subsequent steps 1206, 1210, 1214, 1218, and 1222.

Next, a check is made if there are requests that will stall or monopolize the pipeline (step 1206). If there are requests that are likely to stall the pipeline or monopolize it for a long period of time, request scheduler 1206 sends those requests on a non-DIP connection (step 1208). Otherwise, the process continues to the next step.

A check is made if there are requests with small size classification (step 1210). If there are requests with small size classification, request scheduler 1006 sends those requests to the DIP protocol handler 1008 (step 1212). Small size requests are easily identifiable, typically having on a header section only.

If there are no requests with small size classification, a check is made if there are requests with large size classification that have been waiting for a period of time (step 1214). Typically, requests with body sections are considered for large size classification. The period should be short because other requests can be intermixed with the request body. Thus, if the condition exists, request scheduler 1006 sends those requests to DIP protocol handler 1008 (step 1216). However, if the request body is too large, the request is to be sent on another connection.

If there are no requests with large size status, a check is made to determine if there are requests on the critical path (step 1218). If there are such requests, request scheduler 1006 sends those requests to DIP protocol handler 1008 (step 1220). Non-critical path requests can be sent to the DIP protocol handler 1008 after the critical path requests.

If there are no requests with critical path status, a check is made to determine if there are requests for slow content servers (step 1222). A list of slow content servers can be maintained within each DICE to identify slow content servers. If there are requests for slow content servers, requests scheduler 1006 sends those requests last to DIP protocol handler 1008 (step 1224). The process then continues back to step 1202.

The above scheduling algorithm or method is exemplary, however, any number algorithms can be used based on the above classifications. In certain examples, the scheduling algorithm can change dynamically based on performance changes on the connections. For example, the scheduling algorithms can be adjusted to tune the performance of network connections.

DIP Protocol Handler

Figure 13:
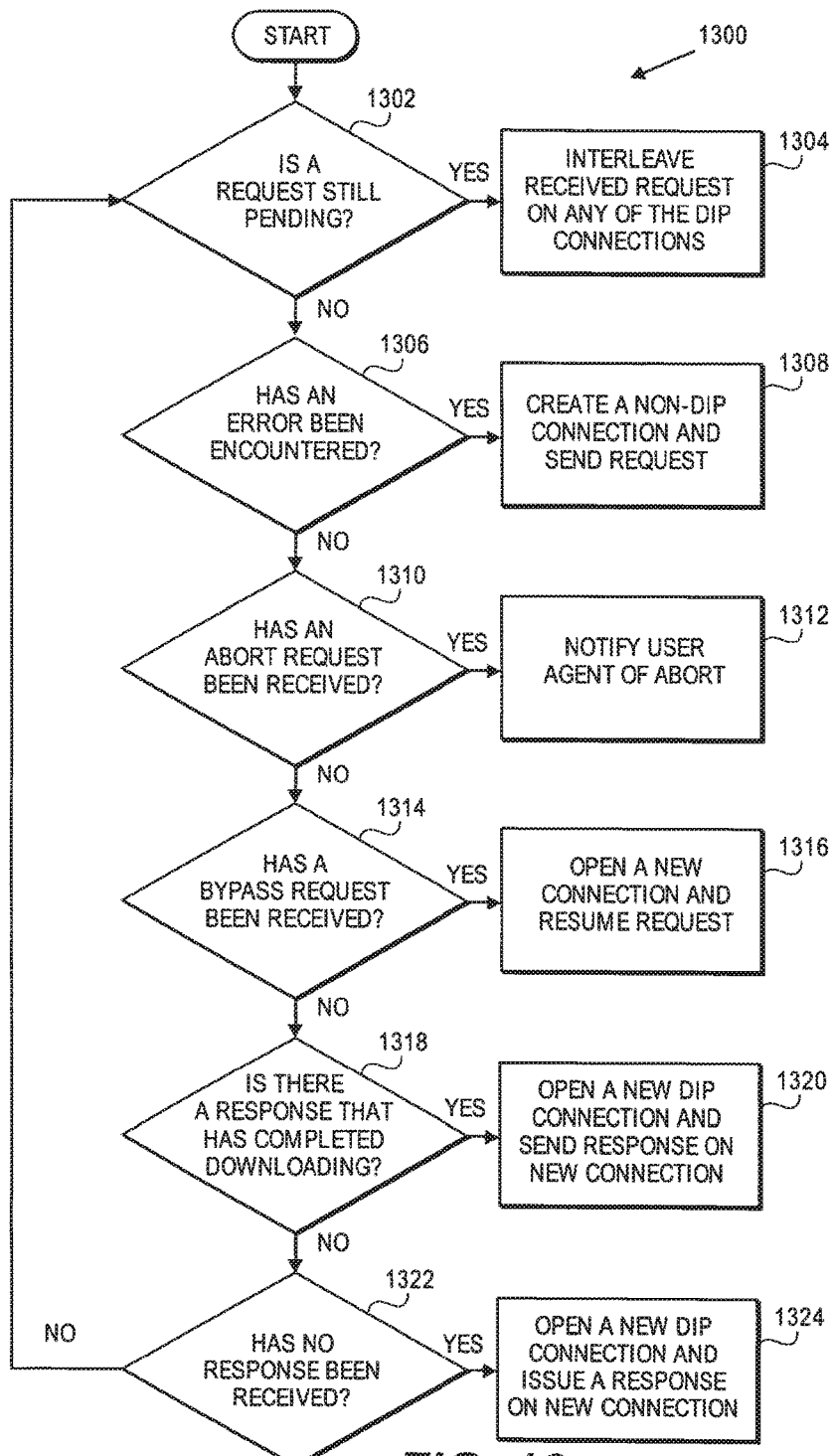
FIG. 13 illustrates one example of a method for a DIP protocol handler in a DICE.

DIP protocol handler 1008 dynamically interleaves and deinterleaves requests and responses to and from DIP connections 605. FIG. 13 illustrates one example of a method 1300 for DIP protocol handler 1008 in DICE 633.

Initially, once a request is received by DIP protocol handler 1008, a check is made if a previous request is being sent on a DIP connection (step 1302). If so, DIP protocol handler 1008 can dynamically interleave the received request on any other DIP connection 605 (step 1304). In certain examples, to provide fair distribution across DIP connections 605, DIP protocol handler 1008 can interleave requests in a round robin manner on DIP connections 605.

If no request is pending, a check is made to determine if an error has been encountered. If so, DIP protocol handler 1008 creates a non-DIP connection (e.g., a standard HTTP connection) and sends the received request on that non-DIP connection (step 1308). If no error has been encountered, a check is made if an abort from a DIPE has been received (step 1310). If an abort has been encountered, DIP protocol handler 1008 notifies the user agent 632 of the abort from the DIPE (step 1312).

If no abort has been received, a check is made if a bypass request from the DIPE has been received (step 1314). If so, DIP protocol handler 1008 opens a new connection and resumes the request on the new connection (step 1315). If there is no bypass, a check is made if is a response to a request has not been received after a period of time (step 1318). If so, a new DIP connection is opened and the request is sent on the new connection (step 1320).

If a response to a request has been received within the set period of time, a check is made to determine if a response has stalled without sending data for a period of time (step 1322). If there is a stalling response, DIP protocol handler 1008 opens a new DIP connection and issues a resume of the outstanding requests on the new connection (step 1324). If there is no stalling response, the process continues back to step 1302.

Figure 14:
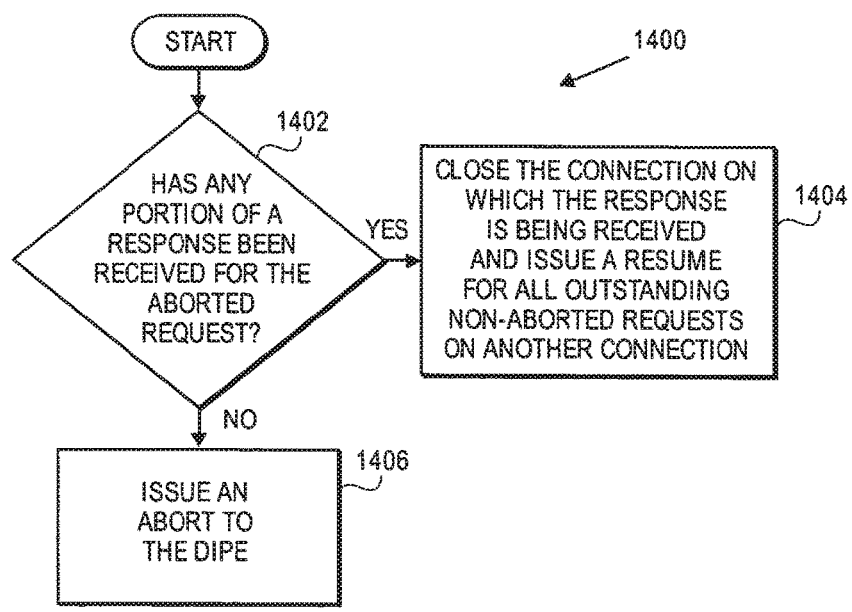
FIG. 14 illustrates one example of a method for handling aborts by a DIP protocol handler in a DICE.

DIP protocol handler 1008 also handles abort requests from user agent 632. FIG. 14 illustrates one example of a method 1400 for handling aborts by DIP protocol handler 1008. Initially, once an abort request is received by DIP protocol handler 1008, a check is made to determine if any portion of a response has been received for the aborted request (step 1402). If so, DIP protocol handler 1008 closes the connection on which the response is being received and issues a resume for all outstanding non-aborted requests on another connection (step 1404). If not portion of a response has been received for the aborted request, DIP protocol handler 1008 issues an abort to DIPE 644.

The above process for handling abort requests can minimize the amount of extra download data that occurs once a request is aborted, minimize the amount of extra upload data required, minimize the (latency) effect on user-experience for non-aborted requests, and minimize performance impact for non-aborted requests. Thus, such a process improves efficiency on the network for a common request such as an abort request.

DIP Connection Manager

DIP connection manager 1010 manages DIP connections 605. DIP connection manager 1010 receives requests for new connections from DIP protocol handler 1008 and maintains at least one outstanding connection such that it can switch to the connection as necessary without incurring the overhead of creating a new connection before issuing a resume.

Response Declassifier

Response declassifier 1002 examines responses returned by DIP protocol handler 1008 and matches the responses with generated requests. Response declassifier 1002 delivers responses to user agent 632 with appropriate information such that the user agent 632 can place the object at the correct place on the web browser. In certain examples, response declassifier 1002 can use a lookup table indexed by request/response IDs to obtain the appropriate information.

Dynamic Interleaving Proxy Engine (DIPE)

The DIPE 644 operates within proxy server 604 and manages the DIP connections 605. DIPE 644 bridges networks 603 and 606 to each other. In this example, DIPE 644 handles requests and responses on network 603 according to the DIP protocol and handles requests and responses on network 606 according to existing HTTP protocols. These components can be any combination of hardware and/or software to implement the techniques described herein. These components is described in further detail below.

Figure 15:
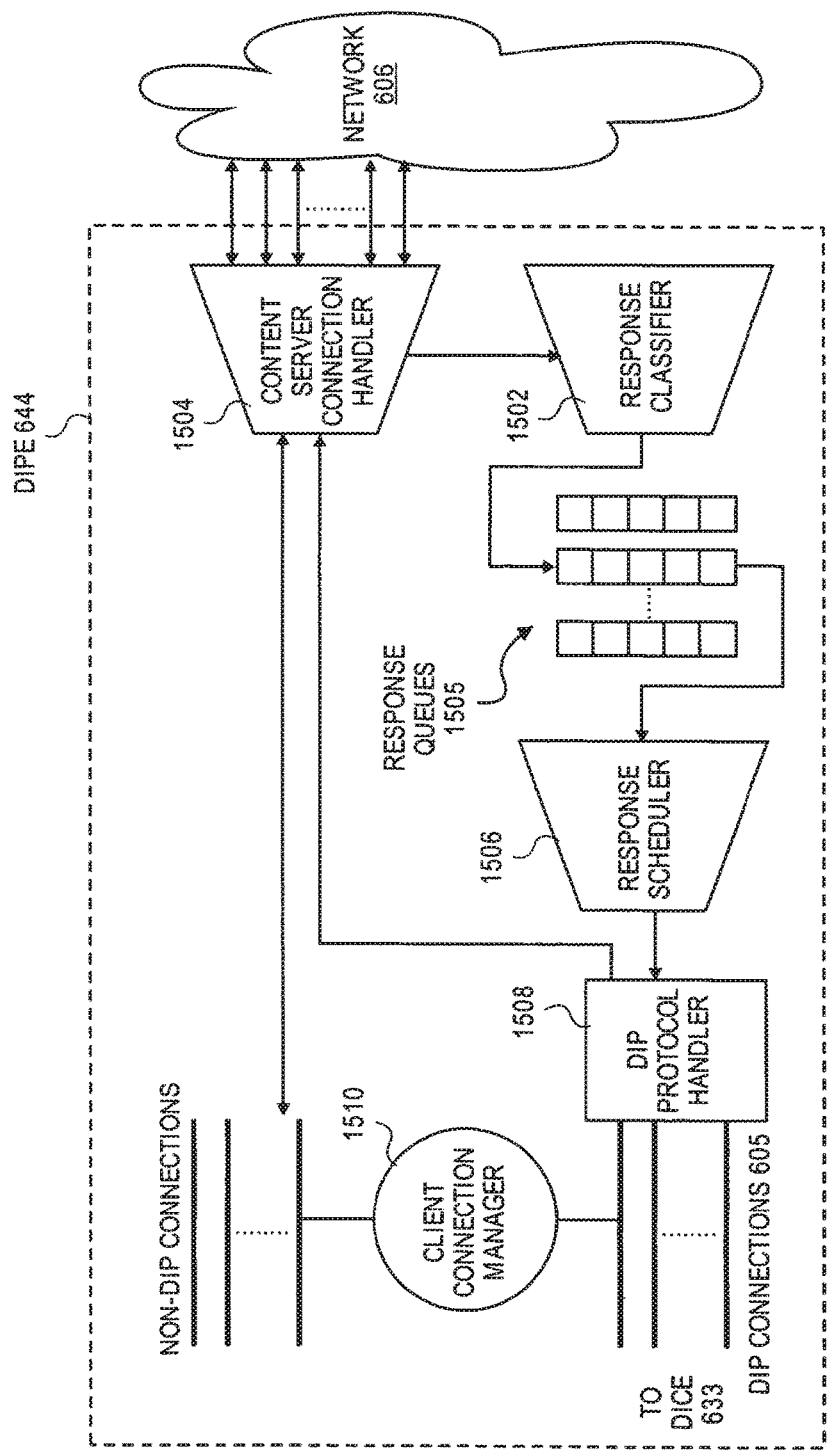
FIG. 15 illustrates one example of a block diagram of the internal components of a dynamic interleaving proxy engine (DIPE) for a proxy server.

FIG. 15 illustrates one example of a block diagram of the internal components of DIPE 644 for proxy server 604. DIPE 644 includes a response classifier 1502, response queues 1505, response scheduler 1506, DIP protocol handler 1408, client connection manager 1510, and content server connection handler 1504. These components can be any combination of hardware and/or software to implement the techniques described herein. Each these components is described in further detail below.

Response Classifier

Figure 16:
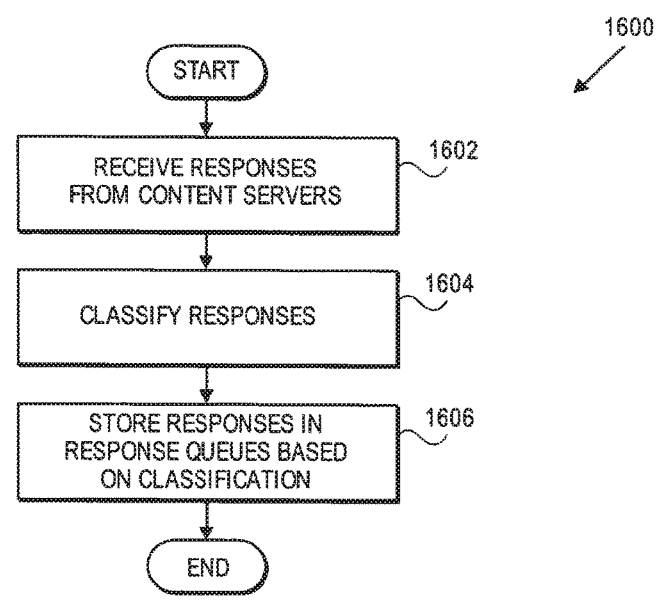
FIG. 16 illustrates one example of a method for a response classifier in the DIPE.

Response classifier 1502 receives responses from content servers 611-613 via content server connection handler 1404 and processes those responses for delivery to client stations 601 and 602. FIG. 16 illustrates one example of a method 1600 for a response classifier 1502 in DIPE 644. Initially, responses are received by response classifier 1502 from the content servers 611-613 (step 1602). Response classifier 1502 then classifies the responses (step 1604). In this step, response classifier 1502 can classify responses using the exemplary classifications noted below. Request classifier 1502 then stores the classified responses in a priority queue within response queues 1505 based on the classification of the responses (step 1606).

Based on the classifications of the responses, the response scheduler 1506 can schedule responses to fully utilized the download bandwidth, thereby increasing bandwidth utilization of the connections. A gap in the download time wastes bandwidth. Causes for such a gap include a slow content server, an error in a response, or no requests to the DIPE. Often times some responses will generate more requests once parsed. Thus, the requests are effectively "chained" into a critical path for the download. If a request for object is classified on the critical path, the object must be downloaded before it can start generating other requests. Thus, if there are no other objects outstanding, the DIPE must wait for the DICE and the user agent to receive the response and generate new requests. This can "drain" the pipeline and cause a gap in the download.

As noted above, any gap causes less-than-optimal bandwidth utilization. The scheduling algorithm based on the classification scheme aims to such gaps in bandwidth utilization in order to improve user experience independently of a web page downloading faster. The scheduling algorithm can order responses such that a user can receive those objects he cares for the most. For example, delivering textual data before graphical data creates a better user experience because the user can start reading the page or even click on a link to go to the next page without waiting for all of the pictures. Furthermore, delivering smaller requests before larger requests usually makes for a better user experience because the user can see that the page is making progress and hasn't stalled. This scheduling algorithm for responses based on the classification of the responses can vary from implementation to implementation. In certain examples, the scheduling algorithm can dynamically vary as the performance of a particular ordering is examined. The scheduling algorithm may also allow for tuning of particular types of data and networks. The ordering is just one of many possible orderings.

Regarding classification of responses, response classifier 1502 can classify requests based on the following exemplary classifications:

Likelihood Response Will Stall During Download:

Response classifier 1502 can classify a response if it is likely to stall during download due to, e.g., a slow or non-responsive content server. Response classifier 1502 can make this determination based any number of factors. For example, if a response is already stored in a cache on proxy server 604, the response would not be likely to stall during download. If the response has been entirely retrieved from a content server into proxy server 604, it is not considered to stall during download. If the response is outstanding for more than predetermined amount of time, the response is considered to be likely to stall during download. Response classifier 1502 can classify responses if criteria such as those noted above are satisfied. Response classifier 1502 stores response in a priority queue within response queues 1505 for this type of classification.

Likelihood Response is on Critical Path:

Response classifier 1502 can classify responses as being on a critical path based on content type. For example, content such as HTML, JavaScript, asp, jsp, and php type content typically generate requests for new objects. Thus, response classifier 1502 can classify responses for such objects as being on the critical path. Response classifier 1502 stores responses in a priority queue within response queues 1505 for this type of classification.

Error Status of Response:

Response classifier 1502 can classify responses based on the error status of the responses. For example, if a content server returns an error for a response (e.g., via standard HTTP protocols), the response is classified having an error. Response classifier 1502 stores responses in a priority queue within response queues 1505 for this type of classification.

Size of the Response:

Response classifier 1502 can classify responses based on the size of the responses. In some examples, response classifier 1502 can determine the size of the responses based on length headers. If no length is specified, the data for the response is queued until a threshold is reached. If it exceeds the threshold, the response is classified as a large response. If the response does not reach the threshold, the response is classified based on its actual size. Response classifier 1502 stores the response in a priority queue within response queues 1505 for these types of classifications.

Type of Content:

Response classifier 1502 can classify responses based on the content type (e.g., image, text, pop-up add, animation, etc.). In certain examples, response classifier 1502 determines content type by a content-type header in the response. Response classifier 1502 can classify responses based on content type into the following groups: HTML group; JavaScript, JSP, PHP, ASP group; Images (e.g., Gif, Jpeg, BMP, PNG, etc.) group; Likely ads (e.g., animated gif, Shockwave Flash) group, documents e.g., (doc, xls, ppt, zip, etc.) group; and multimedia (e.g., mp3, mpg, mov, way, etc.) group.

Request and content server URLs: Response classifier 1502 can classify responses based on the corresponding request and content server URL. For example, a list of potential ad servers and other slow servers can be maintained by DIET 644. The list can be updated as responses from slow servers are received. If a server is on the list, it is labeled as a slow server and response classifier 1502 can classify responses from the server as slow based on the URL of the server. Response classifier 1502 stores responses in a priority queue within response queues 1505 for these types of classification.

The above classifications are exemplary and not exhaustive. Other classifications could be used in other examples to include additional properties or criteria.

Response Scheduler

Figure 17:
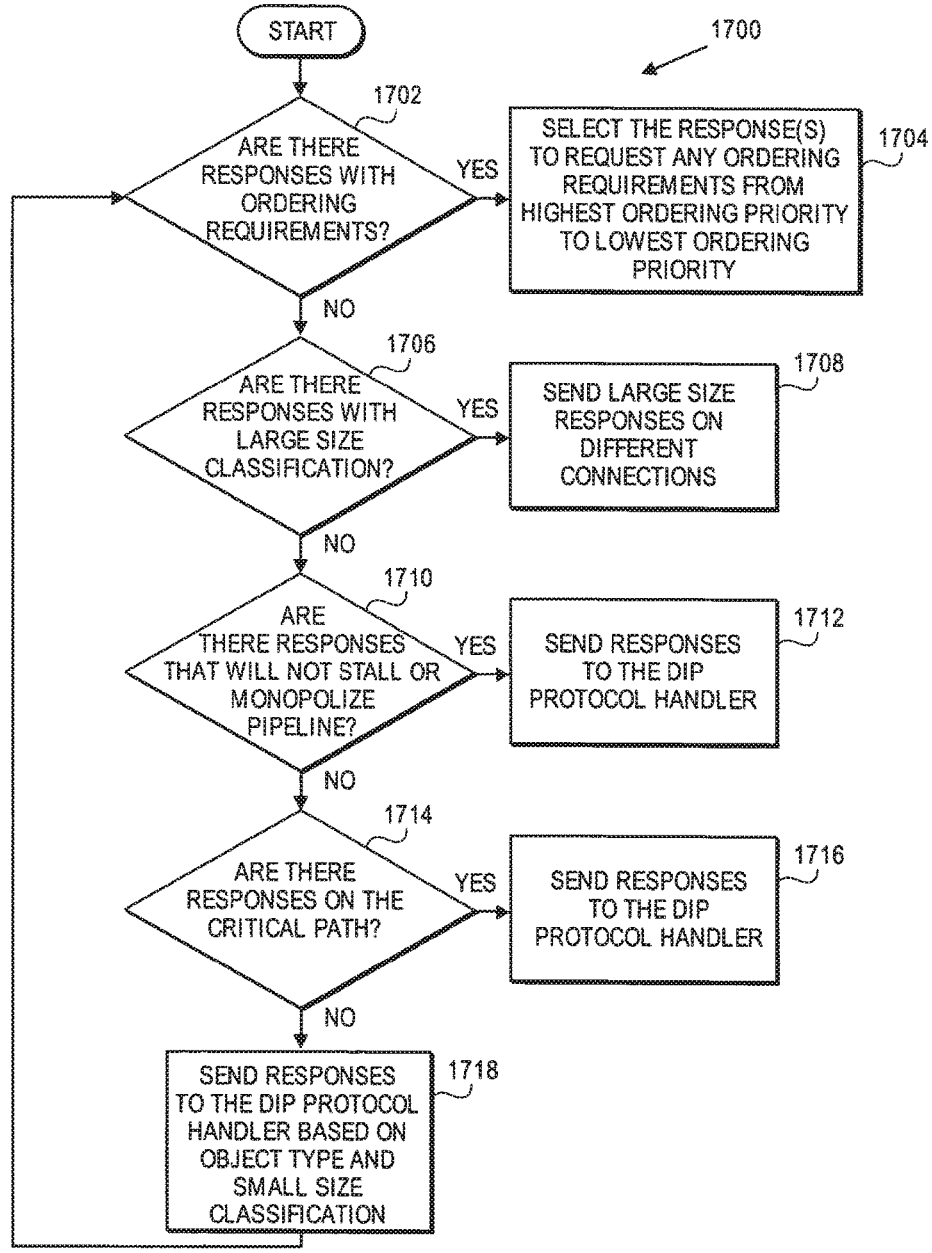
FIG. 17 illustrates one example of a scheduling method for a response scheduler in the DIPE.

FIG. 17 illustrates one example of a scheduling method 1700 for a response scheduler 1506 in DIPE 644. Initially, a check is made if any responses in response queues 1505 have ordering requirements (step 1702). If there are responses with ordering requirements, response scheduler 1506 selects the response(s) to respect ordering requirements from highest ordering priority to lowest ordering priority. Like the above examples for requests, for five responses (A, B, C, D, and E), there may be a strict ordering requirement for responses A, B, and C where A must come before B and B before C, and a loose ordering requirement for D and E that must come before A, B, and C. In this case, responses D and E have a higher ordering requirement and responses A, B, and C have a lower ordering requirement. Response scheduler 1506 will then select responses D and E before responses A, B, and C. However, response scheduler 1506 must choose between response D and E before responses A, B, and C. Consequently, the tie breaking decision process for responses D and E can continue to the subsequent steps 1706, 1710, 1714, and 1718.

Next, a check is made if there are responses with large size classification (step 1706). If there are requests with large size classification, those requests are sent on different connections (step 1708). For example, if responses have a length over a threshold in size. If there are no other connections available, response scheduler 1006 can issue a bypass and force the DICE to move the request to another connection. If there are no responses with large size classification, a check is made if there are responses that will stall or monopolize the pipeline (step 1610). Response scheduler 1506 will send responses that will not stall or monopolize the pipeline next to the DIP protocol handler 1508. Requests that may stall or monopolize the pipeline can be sent to the DIP protocol handler 1508 after those that do not.

Next, a check is made if responses are on the critical path (step 1714). If there are responses on the critical path, response scheduler 1506 sends the responses to the DIP protocol handler 1508 (step 1716). Requests that are not on the critical path can sent to the DIP protocol handler 1508 after those that are not. Finally, response scheduler 1506 can send responses to the DIP protocol handler 1508 based on object type of the responses and size of responses. For example, response scheduler 1506 can send responses based on the groups they are classified, e.g., the HTML group can be sent first over the other, and the JavaScript, JSP, PHP, ASP group can be sent next and son on. Lastly, response scheduler 1506 can send responses based on size, e.g., responses with the smaller size can be sent before responses having a larger size.

DIP Protocol Handler

Figure 18:
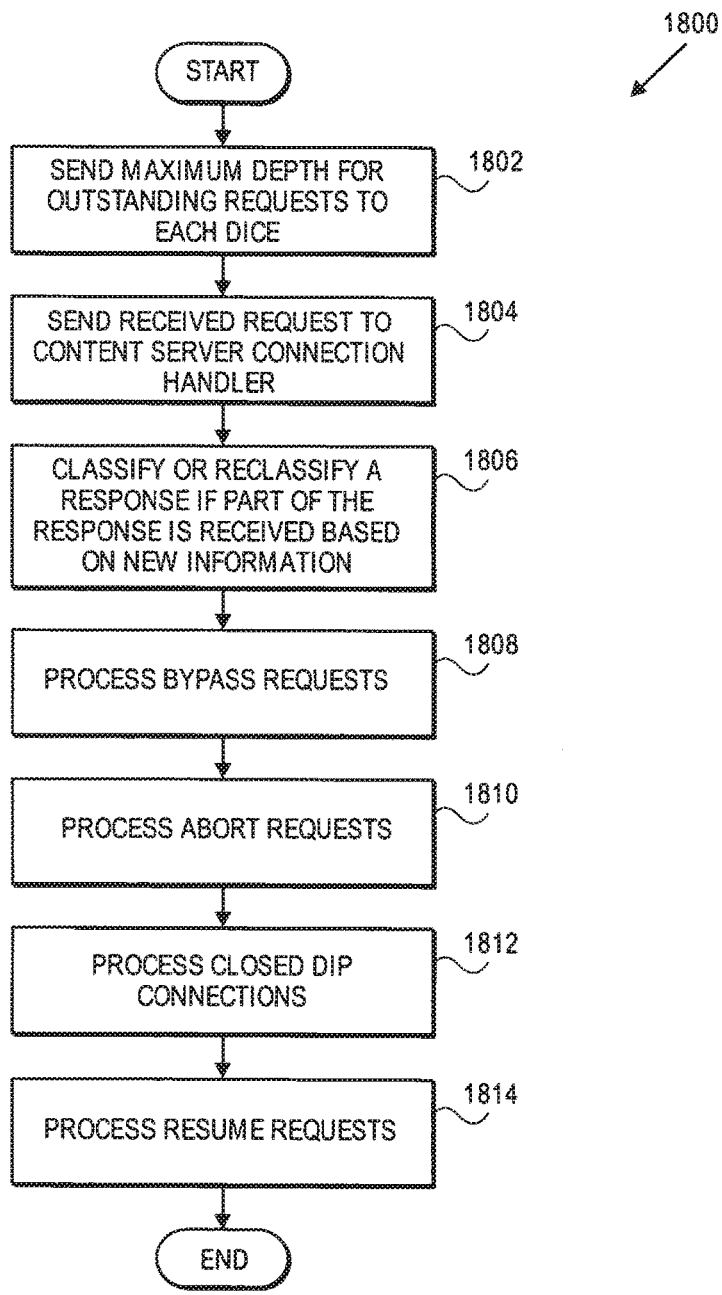
FIG. 18 illustrates one example of a method for a DIP protocol handler in the DIPE.

DIP protocol handler 1508 manages the DIP connections 605 and the DIP protocol itself. Handler 1508 handles requests and sends them to content server connection handler 1504. Handler 1508 also manages responses. FIG. 18 illustrates one example of a method 1800 for DIP protocol handler 1508 in DIPE 644. Initially, DIP protocol handler 1508 send the maximum depth for outstanding requests for each connection to DICE 623 and 633 (step 1802). Next, when DIP protocol handler 1508 receives a request, it sends the request to content server connection handler 1504. If DIP protocol handler 1508 receives part of a response, it classifies or re-classifies that response based on new information (step 1806). DIP protocol handler 1508 issues a bypass requests from response scheduler 1006 (step 1808).

DIP protocol handler 1508 processes abort requests from any of the client stations 601 and 602 (step 1710). For example, if a response has already been sent, DIP protocol handler 1508 ignores the abort request. If the response has already started being sent, DIP protocol handler 1508 ignores the abort request. If the response has not started being sent, DIP protocol handler 1508 removes the response from the response queues 1505 and all associated actions for that request.

DIP protocol handler 1508 processes closed DIP connections (step 1812). For example, if there are no outstanding requests, DIP protocol handler 1508 will gracefully close the connection. If there are still outstanding requests for that connection, DIP protocol handler 1508 will continue downloading them form the content server, and processing them independently. If another DIP connection is available, DIP protocol handler 1508 sends the responses on that connection. If not, DIP protocol handler 1508 keeps the responses in the response queues 1505 up to a threshold amount of time (waiting for a possible resume). If none received, then drop them after the time threshold. DIP protocol handler 1508 processes resume requests. For example, if a resume request is received, DIP protocol handler 1508 abort the list of aborted connections, begins to send down the responses that are resumed on that DIP connection.

Content Server Connection Handler

Figure 19:
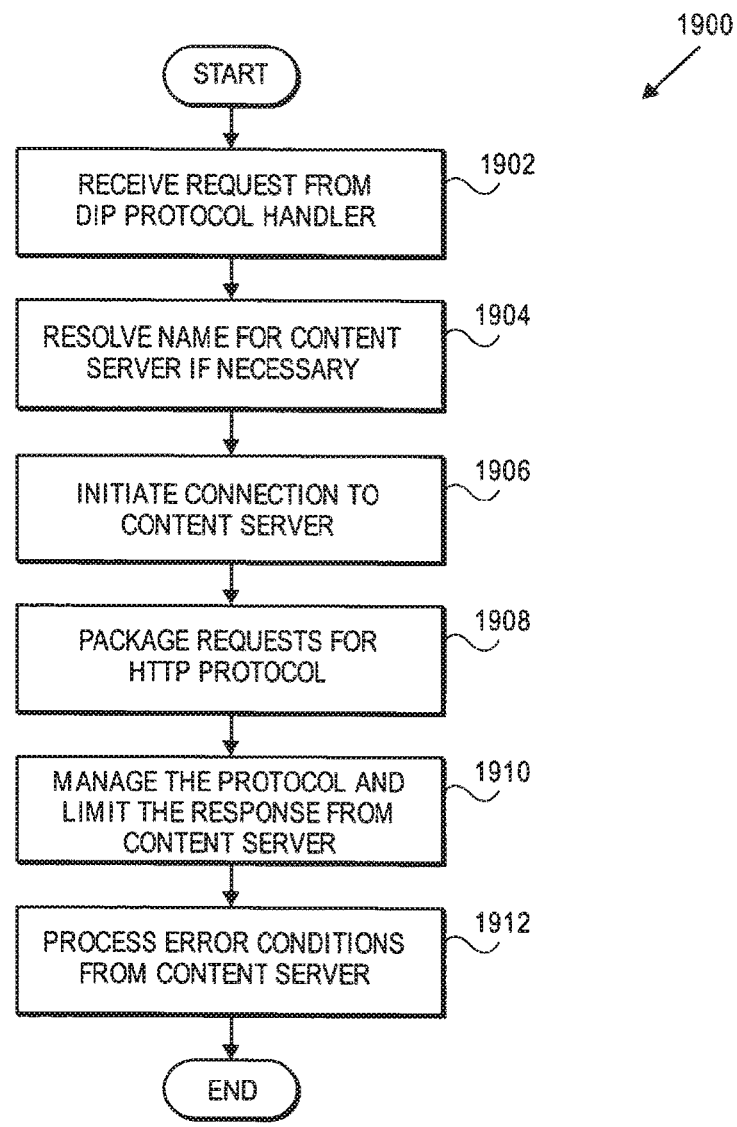
FIG. 19 illustrates one example of a method of a content server connection handler for the DIPE.

Content server connection handler 1504 maintains persistent connections to content servers 611-613 according to existing HTTP protocols. Handler 1504 also manages requests for new connections from the DIP protocol handler 1508 and maintains them as long as an internal threshold and the content servers will allow. FIG. 19 illustrates one example of a method of content server connection handler 1504 for DIPE 644. Initially, a request is received from DIP protocol handler 1504 (step 1902). Handler 1504 then resolves the name for the content server if necessary (step 1904). Next, handler 1504 initiates a connection to any of the content servers 611-613 as necessary (step 1906). Handler 1504 then packages requests according to HTTP protocols (step 1908). Handler 1504 then manages the protocol and delimits the response from content servers 611-613. Finally, handler 1504 processes error conditions from any of the content servers 611-613.

Exemplary Computing System

Figure 20:
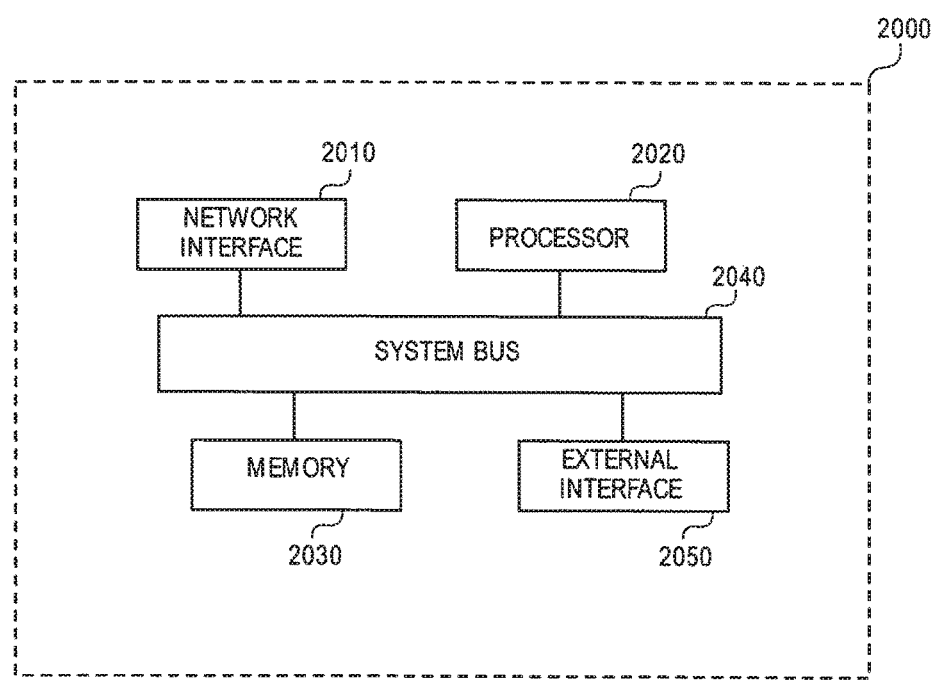
FIG. 20 illustrates one example of block diagram of internal components of a computing system that can be representative of a client station or server in the DIS shown in FIG. 6.

FIG. 20 illustrates one example of block diagram of internal components of a computing system 2000 that can be representative of a client station or server in DIS 600 shown in FIG. 6. These components can be used to perform the DIP protocol techniques described above. Computing system 2000 includes several components all interconnected via a system bus 2040. System bus 2040 can be a bi-directional system bus having thirty-two or sixty-four data and address lines for accessing a memory 2030 and communicating with a network interface 2010 and external interface 2050. Alternatively, multiplexed data/address lines may be used instead of separate data and address lines.

Examples of memory 2030 include a random access memory (RAM), read-only memory (ROM), video memory, flash memory, or other appropriate memory devices. Additional memory devices (not shown) may be included in computing system 2000 such as, for example, fixed and removable media (including magnetic, optical, or magnetic optical storage media). These types of media may also operate as a cache memory.

Computing system 2000 may communicate with other computing systems such as servers and client stations via network interface 2010. Examples of network interface 2010 include Ethernet, telephone, or broadband connection interfaces. Computing system 2000 includes a processor or central processing unit (CPU) 2020, examples of which include the Pentium® family of microprocessors manufactured by Intel® Corporation. However, any other suitable microprocessor, micro-, mini-, or mainframe type processor may be used as the processor for computing system 2000. Processor 2020 provides the support to implement the DIP protocol techniques described herein.

Memory 2030 may store instructions or code for implementing programs, applications, or modules (e.g., the DICE and DIPE components) within a client station, proxy server, or content server shown in DIS 600 of FIG. 6. For example, processor 2020 may execute instructions to implement the processing steps of FIGS. 11-13 and 15-19 for performing DICE and DIPE functions. Memory 2030 can also store an operating system, examples of which can include the Microsoft® family of operating systems, Linux operating system, or other appropriate operating systems that provide networking capabilities.

Computing system 200 may also receive input data or instructions from any number of input/output (I/O) devices via I/O interfaces 2050. Examples of such I/O devices may include a keyboard, pointing device, or other appropriate input devices. The I/O devices may also include external storage devices or computing systems or subsystems. Computing device 2000 may also present information data or information via, e.g., a web browser, on a user agent.

Thus, a method and system for dynamically interleaving requests and responses have been described. Furthermore, in the foregoing specification, the invention has been described with reference to specific exemplary embodiments and implementations thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method performed by a server having one or more processors and a network interface, the method comprising:
acquiring a first request message sent over a persistent connection established between the server and a client station, wherein the first request message comprises one or more packets including a header having a first unique identifier and first control information indicating a first priority for the first request message that is different than a second priority for a second request message;
preparing a first response message for providing first content associated with the first request message over the persistent connection and a second response message for providing second content associated with the second request message, wherein the first response message comprises one or more packets including the first unique identifier that associates the first response message with the first request message and the second response message comprising one or more packets including a second unique identifier that associates the second response message with the second request message; and
transmitting, via the network interface, the first response message and the second response message over the persistent connection in an interleaved fashion, where the first control information allows the server to control an ordering of the first and second response messages.

2. The method of claim 1, further comprising:
storing, in a set of unique identifiers, the first unique identifier, wherein the set of unique identifiers includes a second unique identifier corresponding to the second request message.

3. The method of claim 2, wherein the first control information indicates that the first content for the first request message has lower priority than content for at least another request message.

4. The method of claim 3, further comprising:
evaluating the first control information of the first request message to second control information of the second request message;
determining that the first content associated with the first request message has a lower priority than second content associated with the second request message;
preparing the second response message for providing the second content associated with the second request message over the persistent connection, wherein the second response message comprises one or more packets having the second unique identifier that associates the second response message with the second request message; and
prior to transmitting the prepared first response message, transmitting the prepared second response message over the persistent connection.

5. The method of claim 2, further comprising
preparing a second response message for providing second content associated with the second request message over the persistent connection, wherein the second response message comprises one or more packets including the second unique identifier of the set of unique identifiers, wherein the second unique identifier associates the second response message with the second request message; and
transmitting, via the network interface, at least part of the second response message over the persistent connection while transmitting the first response message.

6. The method of claim 1, wherein the first control information indicates that the one or more packets of the first response message includes a body that is to be segmented based on chunked encoding.

7. A server having one or more processors, wherein the server is communicatively coupled to a client station and comprising:

a network interface to:
  acquire a first request message sent over a persistent connection established between the server and the client station, wherein the first request message comprises one or more packets having a first unique identifier and first control information indicating a first priority for the first request message that is different than a second priority for a second request message, and
  transmit over the persistent connection a first response message providing first content associated with the first request message and a second response message providing second content associated with the second request message in an interleaved fashion, wherein the first response message comprises one or more packets including the first unique identifier that associates the first response message with the first request message, and the first control information allows the server to control an ordering of the first and second response messages.

8. The server of claim 7, further comprising:
a memory to store, in a set of unique identifiers, the first unique identifier.

9. The server of claim 8, wherein the set of unique identifiers includes a second unique identifier corresponding to the second request message.

10. The server of claim 9, wherein the first control information indicates that the first content for the first request message has lower priority than content for at least another request message.

11. The server of claim 10, wherein the one or more processors of the server is configured to:
  evaluate the first control information of the first request message to second control information of the second request message;
  determine that the first content associated with the first request message has a lower priority than the second content associated with the second request message; and
  prepare the second response message to provide the second content associated with the second request message over the persistent connection, wherein the second response message comprises one or more packets having the second unique identifier that associates the second response message with the second request message;
  wherein the network interface is configured to transmit the second response message over the persistent connection prior to the transmitting of the first response message.

12. The server of claim 9, wherein the one or more processors of the server is configured to:
  prepare the second response message for providing second content associated with the second request message over the persistent connection, wherein the second response message comprises one or more packets having the second unique identifier of the set of unique identifiers, wherein the second unique identifier associates the second response message with the second request message, wherein the network interface is configured to transmit at least part of the prepared second response message over the persistent connection during the transmission of the first response message.

13. The server of claim 7, wherein the one or more packets of the first request message further include:
  control information indicating that the one or more packets of the first response message includes a body that is to be segmented based on chunked encoding.

14. A non-transitory computer readable medium that stores a set of instructions that is executable by at least one processor of a server communicatively coupled to a server via a network to cause the server to perform a method, the method comprising:
  acquiring a first request message sent over a persistent connection established between the server and a client station, wherein the first request message comprises one or more packets having a first unique identifier and first control information indicating a first priority for the first request message that is different than a second priority for a second request message;
  preparing a first response message for providing first content associated with the first request message over the persistent connection and a second response message for providing second content associated with the second request message, wherein the first response message comprises one or more packets having the first unique identifier that associates the first response message with the first request message; and
  providing instructions for transmitting the first response message and the second response message over the persistent connection in an interleaved fashion, where the first control information allows the server to control an ordering of the first and second response messages.

15. The non-transitory computer readable medium of claim 14, wherein the set of instructions that is executable by the at least one processor of the server causes the server to further perform:
  storing, in a set of unique identifiers, the first unique identifier, wherein the set of unique identifiers includes a second unique identifier corresponding to the second request message.

16. The non-transitory computer readable medium of claim 15, wherein the first control information indicates that the first content for the first request message has lower priority than content for at least another request message.

17. The non-transitory computer readable medium of claim 16, wherein the set of instructions that is executable by the at least one processor of the server causes the server to further perform:
  evaluating the first control information of the first request message to second control information of the second request message;
  determining that the first content associated with the first request message has a lower priority than the second content associated with the second request message;
  preparing the second response message for providing the second content associated with the second request message over the persistent connection, wherein the second response message comprises one or more packets having the second unique identifier that associates the second response message with the second request message; and
  providing instructions for transmitting the second response message over the persistent connection before transmitting the first response message.

18. The non-transitory computer readable medium of claim 15, wherein the set of instructions that is executable by the at least one processor of the server causes the server to further perform:
  preparing the second response message for providing the second content associated with the second request message over the persistent connection, wherein the second response message comprises one or more packets having the second unique identifier of the set of unique identifiers, wherein the second unique identifier associates the second response message with the second request message; and providing instructions for transmitting at least part of the second response message over the persistent connection while transmitting the first response message.

19. The non-transitory computer readable medium of claim 14, wherein the one or more packets of the first request message further include:

control information indicating that the one or more packets of the first response message includes a body that is to be segmented based on chunked encoding.

* * * * *